US010832228B2

(12) United States Patent
Kayara

(10) Patent No.: US 10,832,228 B2
(45) Date of Patent: *Nov. 10, 2020

(54) PARENT AND DEPENDENT RECYCLING PRODUCT CODES FOR FINISHED PRODUCTS

(71) Applicant: Sammy Kayara, Naples, FL (US)

(72) Inventor: Sammy Kayara, Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/675,344

(22) Filed: Nov. 6, 2019

(65) Prior Publication Data

US 2020/0143334 A1   May 7, 2020

Related U.S. Application Data

(63) Continuation-in-part of application No. 16/180,702, filed on Nov. 5, 2018, now Pat. No. 10,482,299.

(51) Int. Cl.
 *G06Q 10/00* (2012.01)
 *G06K 7/14* (2006.01)
 (Continued)

(52) U.S. Cl.
 CPC .......... *G06Q 10/30* (2013.01); *G06K 7/1413* (2013.01); *G06Q 10/087* (2013.01); *G06Q 30/0625* (2013.01)

(58) Field of Classification Search
 CPC .................. G06Q 10/087; G06Q 10/0875
 (Continued)

(56) References Cited

U.S. PATENT DOCUMENTS 10,482,299 B1* 11/2019 Kayara ............... G06F 16/9554
2002/0013744 A1* 1/2002 Tsunenari ............ G06Q 10/087
705/28

(Continued)

FOREIGN PATENT DOCUMENTS

CN    102467702 A    5/2012

OTHER PUBLICATIONS

Tao, et al., "IoT-Based Intelligent Perception and Access of Manufacturing Resource Toward Cloud Manufacturing", Transactions on Industrial Informatics, vol. 10, No. 2, May 2014, pp. 1547-1557.

(Continued)

*Primary Examiner* — Daniel St Cyr
(74) *Attorney, Agent, or Firm* — Alan G. Towner; Michael D. Lazzara; Leech Tishman Fuscaldo & Lampl

(57) ABSTRACT

A universal, parent-to-dependent manufacturing recycling product code is provided for use on various types of manufactured goods. The recycling product code represents a tool that can be used to process a significant volume of disposed finished products, to capture and communicate essential information about finished products and their components and materials, and to make consistent repair or recycle determinations for the products. Multiple components of the finished product may be associated with dependent recycling product codes (e.g., children and grandchildren codes) which are related to the parent recycling product code. Purchase transactions involving various parts, components and materials can be facilitated through an inventory database by and among recycling centers, repair centers, original equipment manufacturers, individual consumers, and other buyers or sellers.

28 Claims, 16 Drawing Sheets

(51) Int. Cl.
    *G06Q 10/08*     (2012.01)
    *G06Q 30/06*     (2012.01)

(58) Field of Classification Search
    USPC .............................. 235/385, 462.45, 462.01
    See application file for complete search history.

(56) References Cited

U.S. PATENT DOCUMENTS

| | | |
|---|---|---|
| 2002/0031654 A1 | 3/2002 | Bertoglio |
| 2004/0138771 A1* | 7/2004 | Mok ................ G05B 19/41805 |
| | | 700/95 |
| 2007/0198289 A1* | 8/2007 | Hiroshige .............. G06Q 10/06 |
| | | 705/1.1 |
| 2018/0137457 A1 | 5/2018 | Sachs et al. |

OTHER PUBLICATIONS

The International Search Report and the Written Opinion of the International Searching Authority for International Application No. PCT/US2019/059907, 10 pages.

* cited by examiner

Table of Sellers

| Name | Owner | Type | GPS Location | Number | Street Address | Contact Info |
|---|---|---|---|---|---|---|
| Bob Recycling | | Recycling | | R0001 | | |
| Jim Recycling | | Recycling | | R0002 | | |
| ACME | | Factory | | F0003 | | |

FIG. 12

Table of Buyers

| Name | Owner | Type | GPS Location | Number | Street Address | Contact Info |
|---|---|---|---|---|---|---|
| Bob Toys | | Repair | | BR0001 | | |
| Duncan Yoyo | | Factory | | BF0001 | | |

FIG. 13

Inventory Table for R0001 (Bob Recycling)

| Part No. | Quantity | Asking Price | Terms of Sale | Shipping Cost |
|---|---|---|---|---|
| P0001 | 1000 | 20 | | 50 |
| P0002 | 2000 | 30 | | |
| S0001 | 1000 | 20 | | |
| S0002 | 1000 | 20 | | 80 |
| P0001A | 1000 | 20 | | |

FIG. 14A

Inventory Table for R0001 (Jim Recycling)

| Part No. | Quantity | Asking Price | Terms of Sale | Shipping Cost |
|----------|----------|--------------|---------------|---------------|
| P0001    | 500      | 5            |               | 80            |
| P0002    | 500      | 5            |               |               |
| S0001    | 1000     | 20           |               | 60            |
| P0001A   | 1000     | 5            |               |               |

FIG. 14B

Distributor Warehouse (New - D0001)

| Part No. | Name       | Unit Price |
|----------|------------|------------|
| S0001    | Poor Yoyo  | 3          |
| S0002    | Rich Yoyo  | 4          |
| S0003    | King Yoyo  | 5          |
| S0004    | Queen Yoyo | 7          |

FIG. 15

Seller (Used - US2002)

| Part No. | Name       | Unit Price |
|----------|------------|------------|
| S0001    | Poor Yoyo  | 2          |
| S0004    | Queen Yoyo | 5          |

FIG. 16

Factory Warehouse (F0003)

| Part No. | Name      | Unit Price |
|----------|-----------|------------|
| S0002    | Rich Yoyo | 4          |
| S0003    | King Yoyo | 6          |

FIG. 17

Single Component Table

| Product | Number | Material | Factory No. | Weight | Density (m^3) | Density (in^3) |
|---|---|---|---|---|---|---|
| Cotton String (light) | P0001 | Cotton | F0001 | | 75 | 50 |
| Cotton String (heavy) | P0001A | Cotton | F0001 | | 100 | 75 |
| Yoyo disc (light) | P0002 | Plastic Type 2 | F0002 | | 300 | 30 |
| Yoyo disc (heavy) | P0002A | Plastic Type 3 | F0002 | | 400 | 40 |
| Clutch | P0003 | Ceramic | F0003 | | 30 | 80 |
| Bearings | P0004 | Steel | F0004 | | 80 | 60 |

FIG. 18

System Table

| System # | Name | Assembly Factory | 1st Component | 2nd Component |
|---|---|---|---|---|
| S0001 | Poor Yoyo | F0001 | P0001 | P0002 |
| S0002 | Rich Yoyo | F0002 | P0001A | P0002A |
| S0003 | King Yoyo | F0003 | S0002 | P0003 |
| S0004 | Queen Yoyo | F0004 | S0003 | P0004 |

FIG. 19

Table of Factories

| Company Name | Factory No. | GPS Location | Address | Contact Info. | 1st Product | 2nd Product | 3rd Product |
|---|---|---|---|---|---|---|---|
| Duncan Yoyo | F0001 | | | | P0001 | P0001A | S0001 |
| Flores Yoyo | F0002 | | | | P0002 | P0002A | S0002 |
| ACME | F0003 | | | | P0003 | | S0003 |
| Hot Bearings | F0004 | | | | P0004 | | S0004 |

FIG. 20

PARENT AND DEPENDENT RECYCLING PRODUCT CODES FOR FINISHED PRODUCTS

CROSS-REFERENCE TO RELATED APPLICATION

The present continuation-in-part application claims the priority benefit of U.S. patent application Ser. No. 16/180,702, filed on Nov. 5, 2018, the entirety of which is incorporated herein by reference.

FIELD OF THE INVENTION

Various embodiments of the present invention generally relate to computer-implemented processes, tools and techniques for identifying, storing, and locating manufactured goods. In particular, processes, tools and techniques are disclosed for facilitating recycling or repair of finished goods and their components.

BACKGROUND

Most conventional recycling is performed for manufactured goods such as paper, plastics in aggregate, or metal in aggregate, but is not conducted by part or component of finished products. Significant energy is required for a factory or manufacturer to make individual parts or components. If such parts or components are improperly aggregated in the recycling process, a significant amount of their value can easily be lost. However, information about a finished product and its components is typically not readily accessible or otherwise known prior to processing the finished product for repair, maintenance, or recycling. In addition, an excessive volume of disposed components, parts, and other materials presents a daunting challenge for manual sorting processes. These manual processes simply cannot handle the volume of disposed items and do not possess the requisite capability to process the disposed items in a cost effective and efficient way. In many cases, the energy and manual labor information identification costs to identify and process disposed items, including potentially millions of heterogeneous items, can substantially outweigh the benefits of repairing, repurposing or recycling the items. Accordingly, many items simply go to waste.

FIG. 1A illustrates an example of a computer system 2 that has been disposed of and is now a potential candidate for refurbishment, repair or recycling. In this example, the computer system 2 represents a finished product having multiple components and potentially sub-components. As shown, the computer system 2 includes a case 4, a monitor 6, a keyboard 8, and speakers 10. In addition, the case 4 may serve as an enclosure for a variety of sub-components and materials of the computer system 2. These may include hard drive 12 or other memory devices, sound or video cards 14, a mainboard 16, a power supply 18, a cooling fan 20, and/or a variety of other parts or materials 22. From this example, it can be seen that many different types of components can comprise a finished product. Accordingly, for recycling purposes it can be very beneficial to have readily accessible and actionable knowledge of a finished product and its potentially numerous and varied components.

Therefore, enhanced tools and techniques are needed to process a significant volume of disposed items, to capture and communicate essential information about finished products and their components and materials, and to make consistent repair or recycle determinations. One particular long-felt and unsatisfied need is how to make such determinations with sufficient granularity, such as by recycling per component or per quantity of material based on economic calculations.

SUMMARY

Various embodiments of the present invention leverage the benefits of using a universal, parent-to-dependent manufacturing recycling product code on various types of manufactured goods. The recycling product code represents a tool that can be used to process a significant volume of disposed items, to capture and communicate essential information about finished products and their components and materials, and to make consistent repair or recycle determinations. As applied herein to certain embodiments, the term "repair" may be used to refer to fixing or replacing a broken, dysfunctional, or non-functional component or other aspect of a product. In other embodiments, the term "repair" may refer to maintaining or performing routine or scheduled maintenance on one or more components or other aspects of a product. A manufacturing recycling product code is designed to stay on the finished product on a global basis until the end of the finished product's useful life, and to retain an association with the parts, materials, and other components associated with the finished product. The finished product may be associated with multiple components having children manufacturing recycling product codes; sub-components of the components having grandchildren recycling product codes; and potentially other descendant or dependent product codes extending throughout the "family" of product codes.

In one embodiment, indicia associated with the manufacturing recycling product codes may be obtained by the manufacturer or factory, or other entities, such as by use of computer-based tools including websites, databases, and other computer systems. In another embodiment, in situations where creation of a new component, new system, or new product is involved, the indicia may be obtained after data related to graphs, components, materials, and other information are uploaded to various databases. An appropriate database can be accessed to present a parent manufacturing recycling product code for the new product to a manufacturer, for example, to allow the manufacturer to select appropriate components or materials, for example, which are to be associated with the new product. It can be seen that the parent recycling product code may have multiple dependent codes (e.g., children, grandchildren, etc.) already in existence prior to uploading details of the new product to the databases and prior to creation of the parent recycling product code.

Implementation of certain aspects of the invention many involve using a series of product and inventory databases that are accessible on a global basis (e.g., over the Internet) to multiple recycling centers of the world, for example. Recycling process or repair robotic technology and bar code scanners may be employed to allow for quick reading of manufacturing recycling product codes and to facilitate queries to the different databases (e.g., product database, repair database, inventory database, or specialized database). In one embodiment, the databases can be organized with indexed key column by recycling product code per record and may contain certain records which have sub-component and material-based recycling product codes. It can be seen that use of such technology can enable quick response time to assist with the decision to repair or to disassemble and sort components of a disposed product. To facilitate information dissemination, recycling product codes can be made readily accessible to everyone involved in the repair and recycle process. Also, the recycling product codes can be implemented universally on a global basis (including potentially on a sub-component per item or a per material basis) in that each individual recycling center, for example, uses the same code and does not assigns its own unique code instead of the recycling product code. This uniformity permits the product and its components to be known to all recycling centers, parts buyers, and others around the world.

In other embodiments, the present invention may be used in connection with Internet-of-Things ("IoT") technology, including IoT cards comprising state-based or continuous operation sensors. One type of IoT card may comprise sensors plus microcontrollers or processors and can be identified with an IP number. In certain embodiments, this IoT technology can be used in association with different types of operations management computer systems.

In developing the present solution, the inventor has recognized that attempts in the prior art to solve the problems described herein, among other deficiencies, have made the logical error of letting each recycling center assign its own recycling number. Such individualized numbering schemes are meaningless to other recycling centers, repair facilities, and others who process or use recycled materials. In contrast, solutions offered by various embodiments of the present invention may mean that only one set of recycling product codes is implemented on a worldwide basis for all items and materials associated with the recycling process.

BRIEF DESCRIPTION OF THE FIGURES

Various embodiments of the present invention are described with reference to the following figures, wherein like reference numerals refer to like parts throughout the various views.

FIGS. 12 through 20 include examples of data table structures which can be employed in connection with certain embodiments of inventory control systems and/or sales systems described herein.

DESCRIPTION

Figure 1:
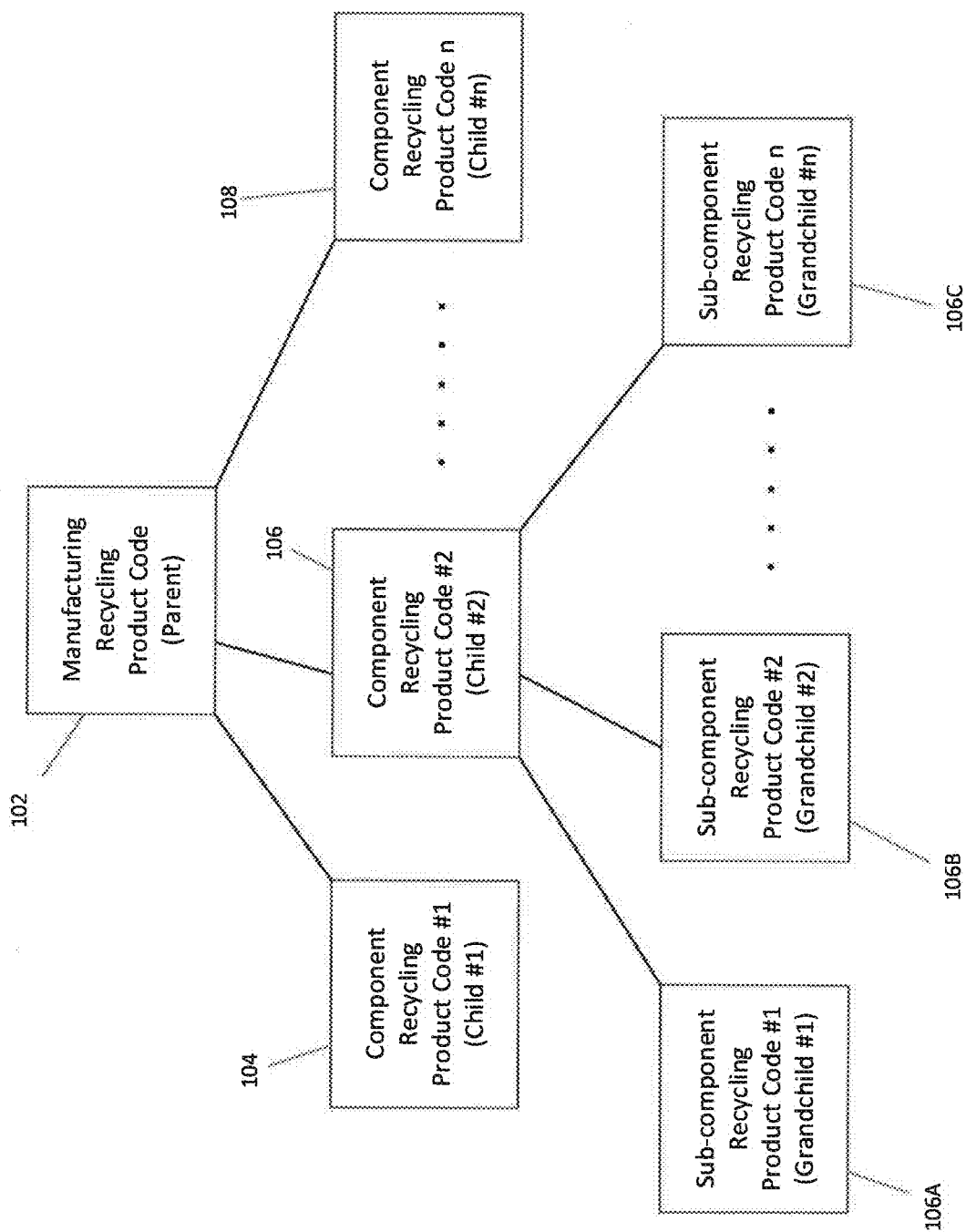
FIG. 1 shows a hierarchy for an example of a parent manufacturing recycling product code and its dependent product codes.
Figure 1A:
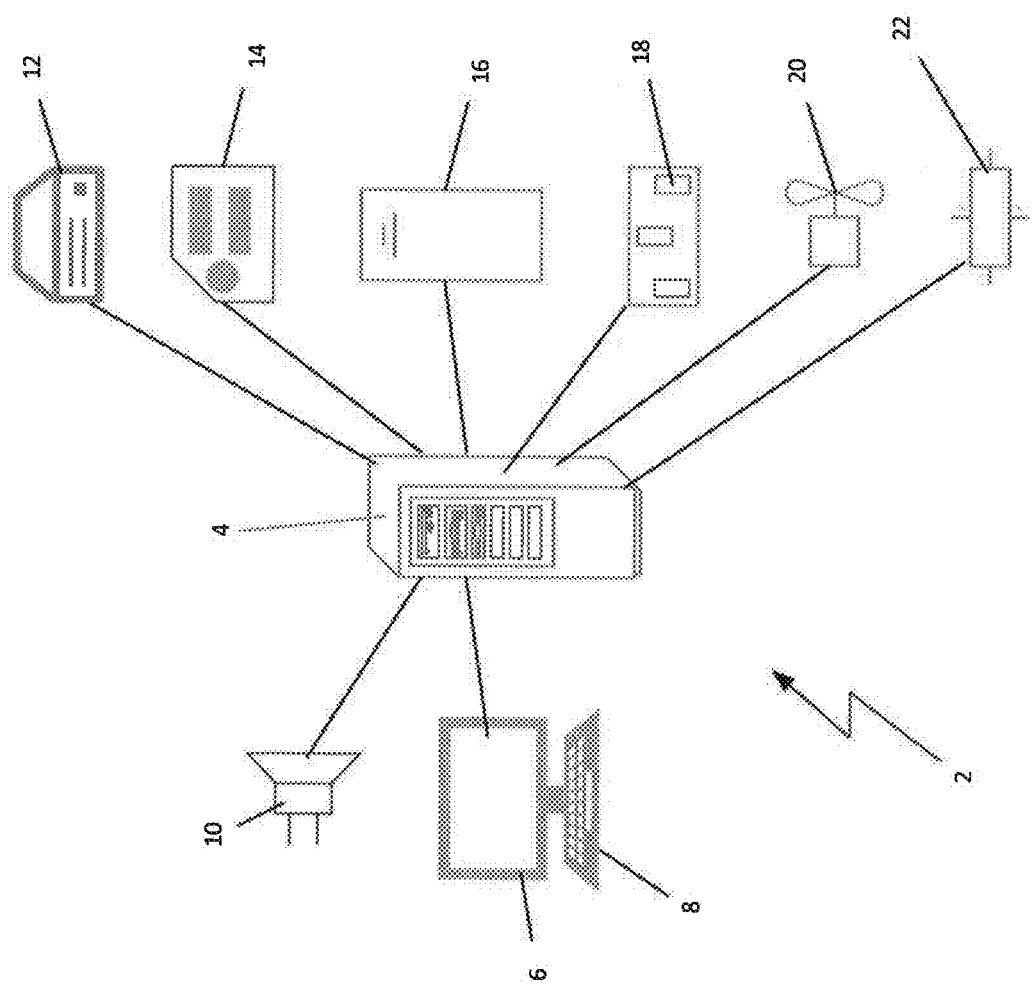
FIG. 1A (prior art) schematically illustrates an example of a disposed computer system that is a potential candidate for repair or recycling.

Many conventional consumer bar codes are placed on packaging for goods and not on the goods themselves. Also, the bar codes can vary greatly among each other based on factors such as region of the world, sales channels, and product dimensions, among others. For example, multiple quantities of a product may be offered for sale in a single package with one product code. However, when individual items are received in the recycling process, there may be no product code on individual items contained within the package because they are not labeled for individual sale. In contrast, a manufacturing recycling product code is designed to stay on the finished product on a global basis until the end of the finished product's useful life, and to retain an association with the component parts and materials of the finished product.

In general, with respect to various embodiments of the present invention, a manufacturing recycling product code can be affixed or imprinted onto a device, item, or other types of finished products or manufactured goods. In practice, an initial search can be performed to determine whether an identical product already exists with a manufacturing recycling product code with the same materials and specifications as the product in question, and that recycling product code can be used. However, if there is no existing manufacturing recycling product code, then a new manufacturing recycling product code can be requested and created by various embodiments of computer systems described herein in exchange for supplying information on children sub-component materials, parts, specifications, assembly graphics, and their associated recycling product codes. The information supplied by product designers or manufacturers may also include product characteristics such as when the product was made, whether materials are degradable, degradation time period, anticipated production volumes, and many other product characteristics or attributes, such as graphical disassembly or assembly sequences, the fragile nature of an item, testing methods for malfunctions, or repair sequences or repair paths.

One manufacturing recycling product code can be provided for the same finished product on a global basis, and the finished product can likewise be consumed, repaired, and recycled in all parts of the world for its materials, parts, and other components. The parent manufacturing recycling product code may have dependent recycling product codes associated with its components as children, and those children may be systems made of grandchildren recycling bar codes, and so on. In one example, a parent manufacturing recycling bar code can be applied to an entire automobile, and dependent children recycling product codes can be applied to the engine and transmission systems of the automobile. Also, the transmission system may have many grandchildren component configurations with their own grandchildren recycling product codes, and so on through the descendancy of the family of product codes. Manufacturing recycling product codes can be assigned to all components and materials, although due to physical space restrictions or medium limitations only certain product codes may be physically and visibly attached and displayed on the product. Information for components or materials which cannot practically have product codes physically or directly applied to them may be stored in a database and associated with the parent recycling product code after identification has occurred for the prime or parent component in the recycling process.

Implementation of certain aspects of the invention may involve using a series of product, inventory, and repair databases that are accessible on a global basis (e.g., over the Internet) to multiple recycling centers of the world, for example. Robotic technology and bar code scanners may be employed to allow for quick reading of manufacturing recycling product codes in high volumes of heterogeneous products involved in recycling, repair or disposal streams, and to facilitate queries to the different databases. It can be seen that use of such technology can enable quick response time to assist with the decision to repair or to disassemble and sort a disposed product. To facilitate information dissemination, recycling product codes can be made readily accessible to everyone involved in the repair and recycle process. Also, the recycling product codes are universal in that each individual recycling center, for example, uses the same code and does not assign its own unique code instead of the recycling product code. This uniformity can permit the product and its components (e.g., parts and materials) to be known identically to all recycling centers, parts buyers, and others around the world.

Those skilled in the art can appreciate the enormity of the problems that can be addressed by different embodiments of the present invention. For example, millions of finished products exist in the world today, with potentially billions of physical components and sub-components, and using thousands of different kinds of materials. In addition, millions of pages of information and other content exist, such as user manuals, instruction sets, and graphics associated with diagnostics, repair, and disassembly of different products and their components.

FIG. 1 shows a hierarchy for an example of a parent manufacturing recycling product code 102 structured in accordance with various embodiments of the invention. In this example, children recycling product codes 104, 106, 108 represent components associated with the parent product code 102, and grandchildren recycling product codes (such as 106A-106C representing sub-components of components associated with product code 106, for example). In various embodiments, the product codes described herein may be embodied as bar codes, three-dimensional bar codes, universal product codes (UPC codes), numeric, alphanumeric, or by other identifying indicia which can be positioned, labeled, stamped, imprinted, or affixed onto finished products and manufactured goods. In certain embodiments, the recycling product code could be embodied on an RFID tag, data stored on any type of machine-readable electromagnetic medium, a chemical representation of data, or a nanoparticle representation of data.

Figure 2:
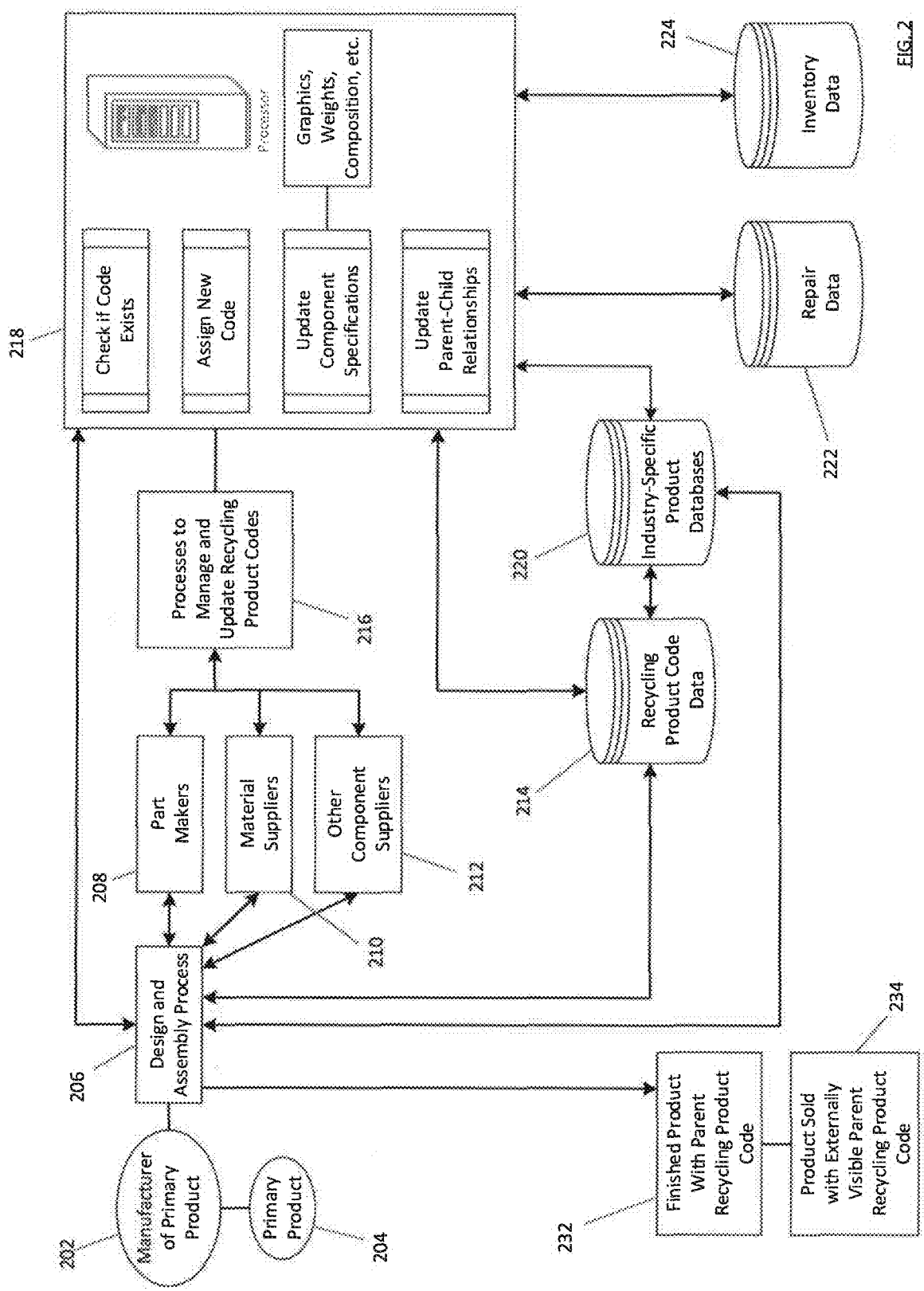
FIG. 2 schematically illustrates an example of a process and computer-implemented architecture structured for creating recycle product code information.

FIG. 2 schematically illustrates an example of a process and computer-implemented architecture structured for creating recycle product code information in accordance with certain embodiments of the invention. As shown, a manufacturer of a primary product 202 makes and assembles a primary product 204 which may be a finished product or another kind of manufactured good, device, or item. In connection with a design and assembly process 206 pursued by the manufacturer 202 to make the product 204, various part makers 208, material suppliers 210, and other component suppliers 212 become engaged in the process 206. Components made or supplied by these entities 208, 210, 212 may include physical parts, chemicals, biological-life materials, or nanotech, among other types of components. The manufacturer 202 may create, through the design and assembly process 206, a new product which requires a manufacturing recycling product code which can be stored in and accessed from a database 214 or another suitable data storage medium, for example. As described above, the parent recycling product code for the product 204 may be created with one or more dependent relationships with children codes, grandchildren codes, or other dependent product codes.

In one embodiment, the component entities 208, 210, 212 may engage in various processes 216 in connection with accessing a computer system 218 programmed to manage and update recycling product code information. For example, an initial search may be performed through the system 218 on an industry-specific product database 220 or the recycling product code database 214 to see if there is an existing recycling product code associated with a given component to be made or supplied. If one of the component entities 208, 210, 212 acts as a manufacturer of a sub-component type of product 204, for example, it can use the design process 206 to make a version of the product 204 which may be primary to them but which is a sub-component to others. If no association for the component or material exists in databases 214, 220, then information including graphics of assembly, disassembly, specifications, composition details, material lists, lists of dependent (i.e., children, grandchildren, etc.) manufacturing recycling product codes, and repair instructions, among other data can be uploaded to the system 218. In one embodiment, the information can be stored in an industry specific database 220 and cross-referenced to the recycling product database 214 and manufacturers can upload repair graphics, for example, to a report database 222. Then a new recycling product code or codes can be assigned accordingly in association with the uploaded information. If the product 204 has a material component like powder or gas to which a recycling product code cannot be physically applied, then the product details can be stored in one or both of the databases 214, 220, including identifying graphically how the material is applied, removed, and stored. In certain embodiments, at the recycling stage, for example, machine vision technology or sensors with lasers can be used to discover the recycling product code by capturing a machine vision image or scanning and matching features to graphics supplied by engineers, scientists or technologies describing product when they first applied for recycling product code. If there is a match then the system knows the specific product and can and retrieve the disassembly instructions, for example. Thus, materials without physical recycling product codes can nonetheless be managed appropriately with machine vision technology, for example.

In various embodiments, the system 218 stores recycling product code data in the database 214 and returns recycling product code data upon requests or queries by the entities 208, 210, 212, or as part of the design and assembly process 206. The manufacturing recycling product code data in databases 214, 220, 222, 224 can be made available to the entities 208, 210, 212 when they make their own purchases of sub-components from sub-component makers and others commercially downstream in the production process from the manufacturer 202. For example, the primary product 204 can be an automobile, the manufacturer 202 may be an automobile manufacturer, entity 208 may be a transmission maker that makes a sub-component to the automobile 204. Although, the manufacturer 202 may also be in its own world or industry a primary component maker and/or a maker of other components using the processes 216, the system 218, and/or the databases 214, 220 to assemble a transmission from many sub-components. In the example shown, the system 218 can enable searches for product codes from text verbal descriptions, store product details on each item and on each material, enable updates for component specifications, update parent and dependency code relationships, and synchronize data with many other databases to maintain data accuracy of product information.

In certain embodiments, each industry-specific product database 220 may be a specialized database including data associated with one type of industry (e.g., auto, aviation, chemicals, military, major appliances, electronics, etc.). Users 202, 208, 210, 212 of the system 218 can also communicate with a repair database 222, which includes information on how to repair different kinds of products 204 and what components are required for the repair process. In other embodiments, the system 218 can communicate with an inventory database 224 which contains data associated with locations and quantities of recycled components on a global basis. When a request by one of the entities 208, 210, 212 is made, information such as the production volume of given product, identification of new products, and identification of discontinued products, for example, can be provided by the entities 208, 210, 212 and captured at the same time for storage in a database 214, 220, 222, 224. It can be appreciated that the system 218 may synchronize or communicate between or among the different databases 214, 220, 222, 224 in order to retrieve or store relevant data. In certain embodiments, the databases 214, 220, 222, 224 may be configured with a key record index of recycling product codes and each record in the database may have different secondary indexes. For example, inventory database 224 may have a primary index of recycling product codes and a secondary key index of recycling center storage numbers, addresses, GPS coordinates, etc. The repair database 222 may have repair information and graphics uploaded to it by the entities 208, 210, 212, using the processes 216 or the system 218, or perhaps by public uses in a blog format, for example, for public members to add their experiences with that item.

In practice, the design and assembly process 206 can also be accessed by the component entities 208, 210, 212 directly to obtain recycling product code data for components and materials to be assigned to the primary product 204. After that, a request for a parent manufacturing recycling product code can be made. In another embodiment, the manufacturer 202 can use the design and assembly process 206 to access the system 218 and/or one or more of the databases 214, 220, 222, 224 directly to obtain recycling product code or component information. For example, once information is known for the children components of the primary product 204, then a parent manufacturing recycling product code can be created. In certain embodiments, product design software (such as software packages used in specific industries—automotive, semiconductor, plastics, etc.) can be configured to work in conjunction with the system 218 and/or one or more of the databases 214, 220, 222, 224. For example, when a component is selected at the design level, the software can be programmed to search for relevant recycling product codes for parts and materials of that component sub-system. When design of a primary product 204 has been completed by the design and assembly process 206, parent manufacturing recycling product code for the product 204 is ready to be created after data files associated with the product 204 have been uploaded for future retrieval from one or more of the databases 214, 220, 222, 224.

After the design and assembly process 206 has been completed, at step 232 a finished product is created with a parent manufacturing recycling product code. The parent recycling product code may be stamped, imprinted, or otherwise affixed to the finished product in a location that is accessible to bar code readers, for example, or other technology that can detect and interpret the indicia associated with the recycling product code. As noted above, the parent recycling product code incorporates in children, grandchildren, and other dependent product codes associated with parts, materials, and other components that have been incorporated into the finished product. At step 234, the product can be offered for sale and sold in markets on a global basis with an externally visible parent recycling product code.

Figure 3:
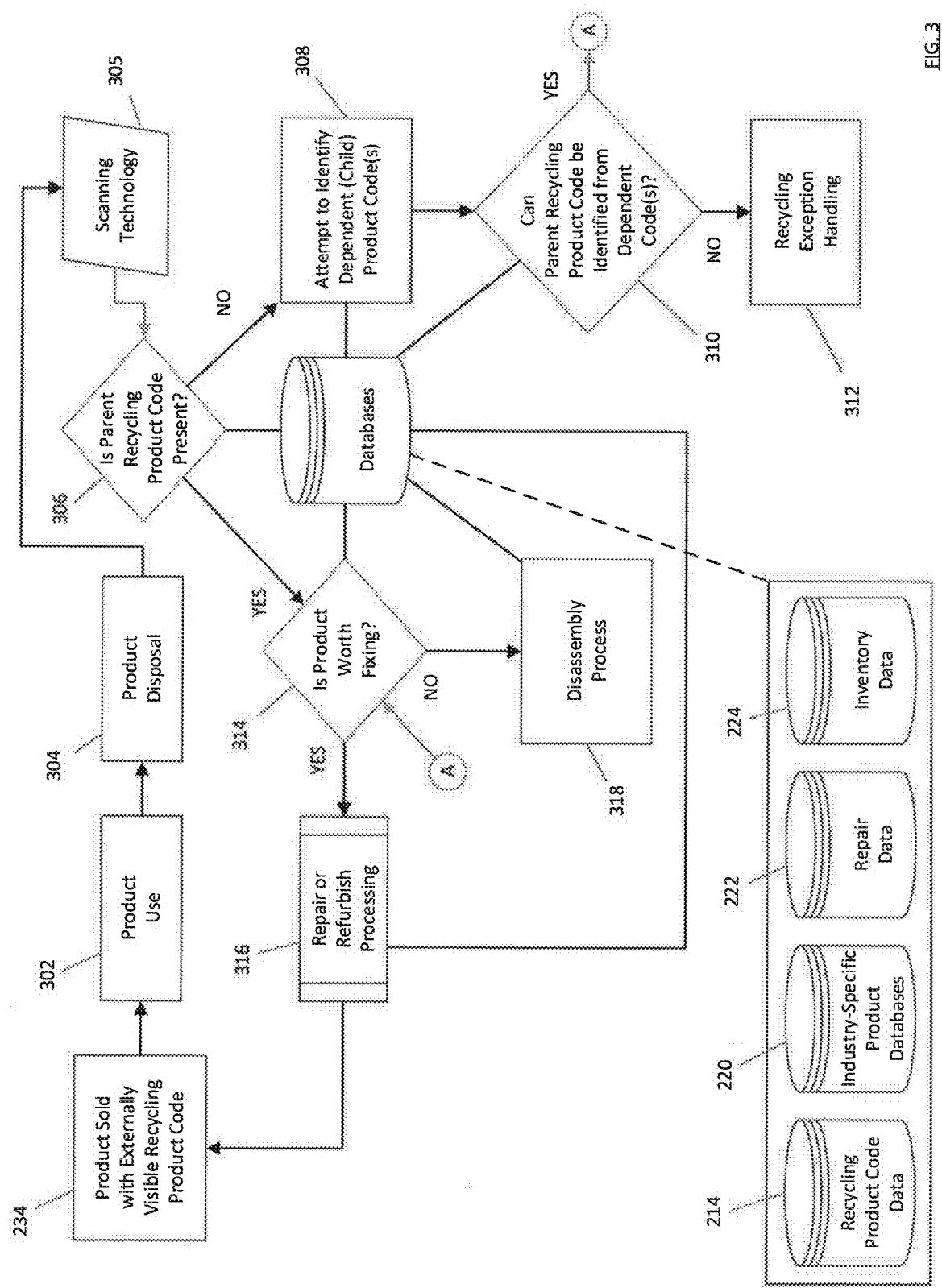
FIG. 3 illustrates an example of a process and associated computer architecture for determining whether to repair or disassemble a disposed product.

FIG. 3 illustrates an example of a process and associated computer architecture for determining whether to repair or disassemble a disposed product. As shown, products with externally visible parent recycling product codes are sold at step 234, used at step 302 by consumers, and then disposed of at step 304. At step 305, scanning technology can be used to execute software to operate bar code scanners, robots, or other apparatus to a high-volume stream (e.g., millions) of pieces, items, or other products to be recycled. The scanning technology employed at step 305 may include conveyor belts or other means for transporting the high-volume stream of products past a bar code scanner as it travels through a recycling center, for example. The scanning technology may operate in conjunction with searching functionality that attempts to identify at step 306 whether the recycling product code in question is contained in the recycling product code database 214 or database 220, for example. In certain embodiments, repair shops may access the databases 222, 224 in connection with performing repairs or to buy or sell used parts, for example, and such users may share their repair experiences through electronic bulletin boards, for example, or other communication means.

If the parent recycling product code cannot be determined at step 306, then the process may involve checking for one or more dependent recycling product codes for components of the finished product at step 308. For example, with reference to FIG. A, the case 4 of the computer system 2 may be opened to reveal a child recycling product codes imprinted on the mainboard 16, the power supply 18, and the fan 20. In one embodiment, machine vision identification can be used to identify children recycling product codes, such as by a process that captures component dimensions using lasers and matches those captured parameters against shapes and dimensions stored in one of the databases 214, 220, 222, 224 to identify the components, for example. In another embodiment, a reverse search can be performed based on a given set of child recycling product codes to identify a primary product. In this manner, a parent recycling product code may be determined at step 310 by obtaining knowledge of a sufficient number of the child recycling product codes associated with its components, and the working upward or in reverse through the hierarchy to identify the parent recycling product code. In certain embodiments, searches may be assisted by using or comparing captured machine vision measurements and shapes against graphics uploaded into one of the databases 214, 220, 222. However, if the parent recycling product code still cannot be determined, then the process may involve certain recycling exception handling activity at step 312. For example, this activity might involve manual investigation into the finished product, its origins, and the nature of its components. If a parent recycling product code can be determined at step 310, then processing can proceed to a determination of whether the product is worth fixing at step 314 (see below).

If the parent recycling product code can be determined at step 306, then a determination can be made at step 314 whether to fix or disassemble the finished product. The processing at step 314 may involve accessing one or more of the databases 214, 220, 222, 224 to locate instructions, parts, materials or other components, for example, for performing a repair or refurbishing process at step 316. Such repair or refurbishing may be performed by countries or sectors of the economy which have comparatively lower labor costs than other countries or economic sectors. This might include, for example, downloading assembly instructions from an industry specific product database 220, locating and purchasing a part available through the inventory database 224, and/or downloading repair instructions from the repair database 222, among other activity. In one embodiment, the inventory database 224 may include cost or price data associated with fixing a given product, and such data can be used in the determination made at step 314 whether to repair or refurbish the product at step 316, for example. The repaired or refurbished product can then be placed back into the commercial stream at step 234 for sale to consumers. However, if it is determined at step 314 that the finished product cannot be repaired or refurbished, then a disassembly process can be engaged at step 318.

Figure 4:
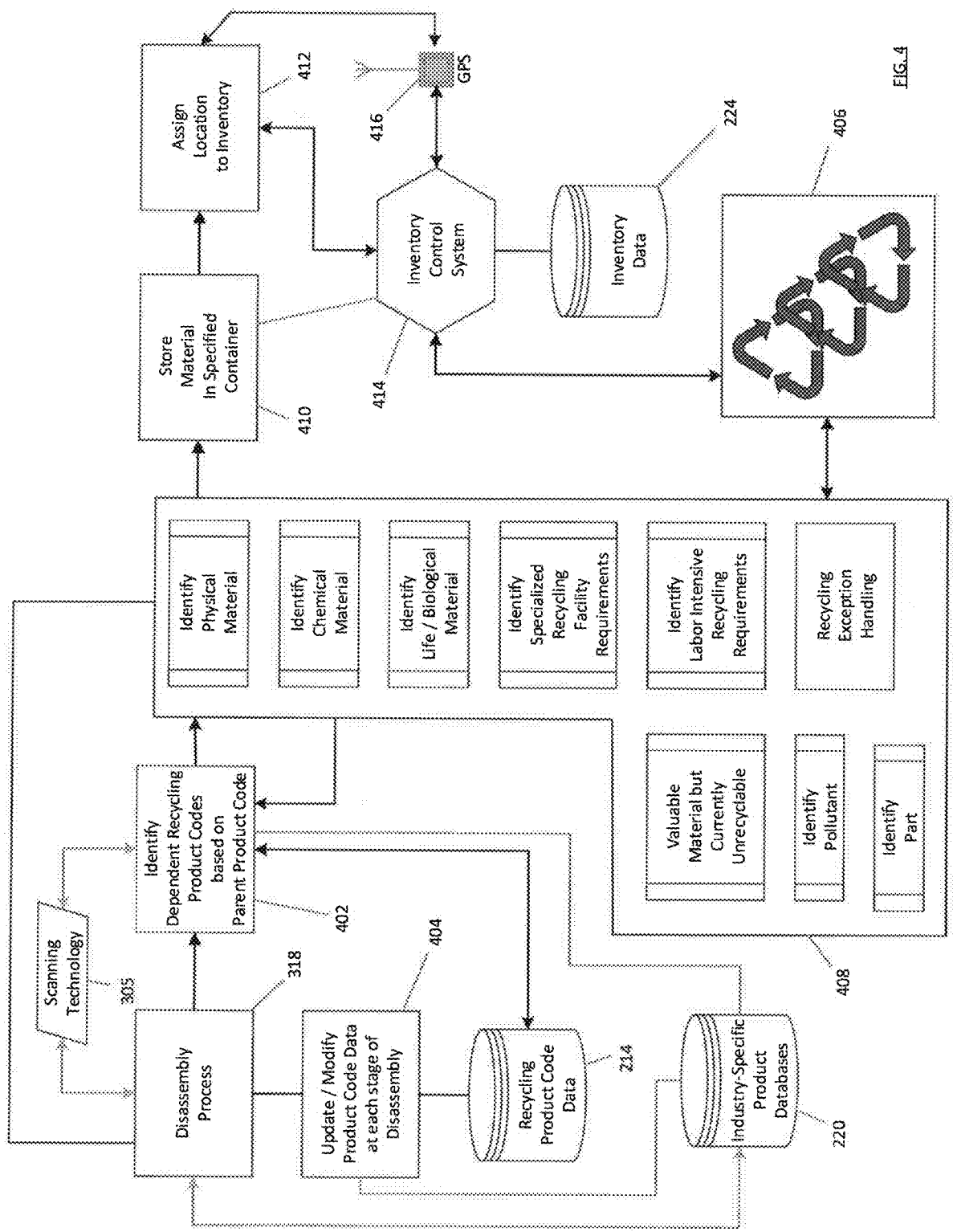
FIG. 4 illustrates an example of a process and associated computer architecture for disassembly and recycling for a disposed product.

FIG. 4 illustrates an example of a process and associated computer architecture for disassembly and recycling for a disposed product. The disassembly process begins at step 318 by using disassembly instructions associated with the manufacturing recycling product code of the finished product to be disassembled by accessing one or more of the databases 214, 220, 222, which may contain disassembly instructions stored by various manufacturers 202, recycling centers, or other users. The disassembly process of step 318 may employ scanning technology 305 to obtain manufacturing recycling product code data as a continuous process. At step 402, dependent recycling product codes are identified in connection with the parent recycling product code imprinted on the finished product. To the extent that new or different product code data is discovered during the disassembly process, the recycling product code database 214 can be updated or modified at step 404. It can be seen that knowledge of the parent recycling product code provides a recycling facility 406, for example, with knowledge about the finished product it needs to disassemble and recycle. At step 408, various components of the finished product, including physical parts, chemical and biological materials, and other components can be reclaimed from the finished product for storage in appropriate containers at step 410. Also, pollutants and other specialized recycling components can be identified for special handling. In certain embodiments, valuable materials which are then currently non-recyclable can be identified and stored appropriately for potential future processing. In addition, components associated with labor intensive recycling and/or other recycling exception handling (e.g., components which cannot be associated with a recycling product code) can be labeled, stored, and/or located for appropriate processing or disposal. In certain embodiments, it can be appreciated that certain components may have multiple sub-components. Accordingly, the process may return from step 408 back to step 402 to identify the relevant recycling product codes for those grandchildren (or other dependent relationship) and to determine how best to process and store the sub-components. In certain embodiments, cost or price information accessed from the inventory database 224 can be used to determine the granularity or extent of the recycling to be performed.

At step 412, the identified and stored components can be assigned a location in an inventory control computer system 414. The nature of the component, its quantity, geographical location, availability for purchase, and other data can be stored in the inventory database 224, for example. In certain embodiments, the inventory control system 414 may be operatively associated with a global positioning system (GPS) 416 to facilitate knowledge of the location of the component or perhaps to track its movements when in transit from one location to another. The inventory control system 414 may be programmed to periodically examine the quantity (e.g., count), weight, or volume of materials stored as part of step 410, and may update price or cost information for various items, components, or products. As noted above, this price or cost data can be stored in the inventory database 224. In certain embodiments, the inventory control system 414 can be programmed to periodically update the inventory database 224 with transportation pricing inside of a region, area, nation, or other geographic or market identifier. Also, the inventory control system 414 may be programmed to synchronize its inventory database 224 with other inventory databases at other recycling centers 406 locally, regionally, nationally, and/or internationally. This synchronization may assist: companies searching for parts or materials; users searching for parts or materials for repairs; low wage nations searching for quantities for repair or refurbishing for reusing at a low wage price; pollution control centers seeking access to inventory of pollutants to neutralize in the future when costs are lower; government or private sector scientists looking to harvest valuable minerals from components that are now not economical, impossible or very difficult but in the future economical recycling can be carried out; or low wage nations searching for inventory of labor intensive exception handling inventory to provide work for workers.

Figure 5:
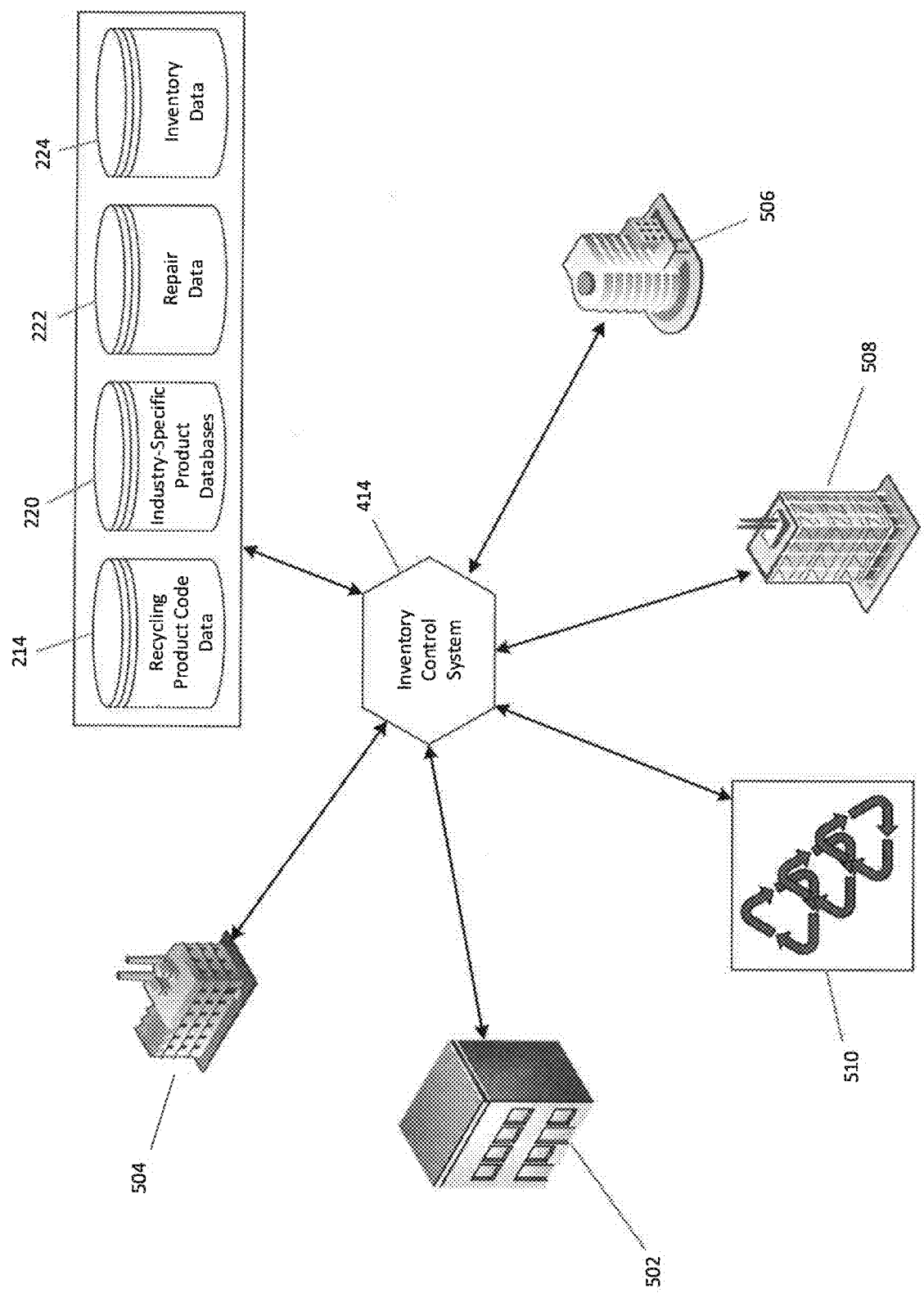
FIG. 5 schematically illustrates the interaction of various entities with a global inventory of products and their manufacturing recycling product codes.

FIG. 5 schematically illustrates the utility and benefits of having a global inventory of products with unique manufacturing recycling product codes. Because each product is assigned a unique manufacturing recyclable product code number, all such products with the same identifier are globally and universally identifiable. As shown, the inventory control system 414 can be connected for communication with one or more of the databases 214, 220, 222, 224. For example, the inventory database 224 may possess GPS location data for components stored around the world which can be aggregated by region to reduce transportation costs for a potential purchaser of the component.

In various embodiments, various entities may access the inventory control system 414 for a variety of different purposes. For example, a materials processing company 502 may want to purchase quantities of a given chemical or biological material for its business. A factory 504 may want to acquire component parts for a new assembly line or finished product it has developed. A repair facility 506 may need to perform a search by manufacturing recycling product code for a component part it needs to repair or refurbish a finished product. In another example, a research center 508 may have developed a new process for handling a pollutant or for recycling a previously non-recyclable component and may want access to the locations and quantities of such components. In another example, certain recycling centers 510 may specialize in recycling certain types of challenging or labor-intensive components and would like to get information on where and in what quantities such components are stored on a global basis.

In other embodiments, the present invention may be used in connection with Internet-of-Things ("IoT") technology. For example, one type of IoT card may mainly comprise a sensor such as for sensing or detecting temperature, heat, humidity, gas, light, chemicals, acidity). Such cards may or may not have a unique IP number associated with them. Another type of IoT card may comprise sensors plus microcontrollers or processors and can be identified with an IP number. Such cards can be master-to-slave controlled by operations management software, for example, or they can be configured for peer-to-peer or machine-to-machine (m2m) interaction or communication.

In certain embodiments, this IoT technology can be used in association with different types of operations management computer systems. One example of such an operations management system can be a computer that notifies a manufacturer when a machine is inoperative or operating at less than optimum levels. However, conventional systems cannot correlate operational telemetry for a machine on a real-time basis with the nature of components or sub-components in that machine that are likely to fail as indicated by the communicated telemetry. This is mainly because such conventional systems lack access to the information supplied by embodiments of the manufacturing recycling product code described herein. Retrieving component data that X variable telemetry is at a certain level for a given component, for example, can yield data regarding operating conditions of a machine. For example, sub-component ABC may be broken or non-functional within the machine, or the machine may be need to cleaned or lubricated. Absence of manufacturing recycling code component data can defeat granular sub-component problem identification for machine maintenance or problem diagnostics. Before the solution provided by the present invention was developed, a notification needed to be communicated that an entire machine was a problem. There was no significant capability to obtain information to diagnose a specific component problem within the machine.

As described below in more detail, combining an IP number—which informs specific location, function, and identification—with recycling product code data allows for identification of different variable parameters that may be derived from state-based or continuous operations. Collected data can be compared to the expected ideal (e.g., for gap analysis) and can assist with subsequent decision making. In various embodiments, sensors employed herein may be state-based to the extent that the sensors in the IoT card can be designed to draw power from a power supply, run a test, and communicate test results through a gateway, for example. In another embodiment, the state-based sensor may be a passive physical or chemical component, for example, which is active with chemical operations (e.g., light, radiation, humidity, chemical degradation, temperature, etc.). In other embodiments, the sensors may be employed as part of the continuous operation of a machine or finished product, and the machine or product may supply power to the sensor for its sensing, monitoring, or other data communication functions. Without combining IoT sensor data and manufacturing recycling code, products might otherwise be incorrectly disposed based on shelf life that is set by factories, not based on the reality of how the products were transported, or stored, or exposed to heat, humidity, or chemicals. This can result in a sub-optimal decision about disposition of the products. These products may have been stored in ideal circumstances so there is no need to dispose of them. Combining IoT sensors and manufacturing recycling codes can yield new higher optimum outcomes with inventory, logistics, transportation, and sales at the right time, in the right markets, and at the correct or best prices.

Figure 6:
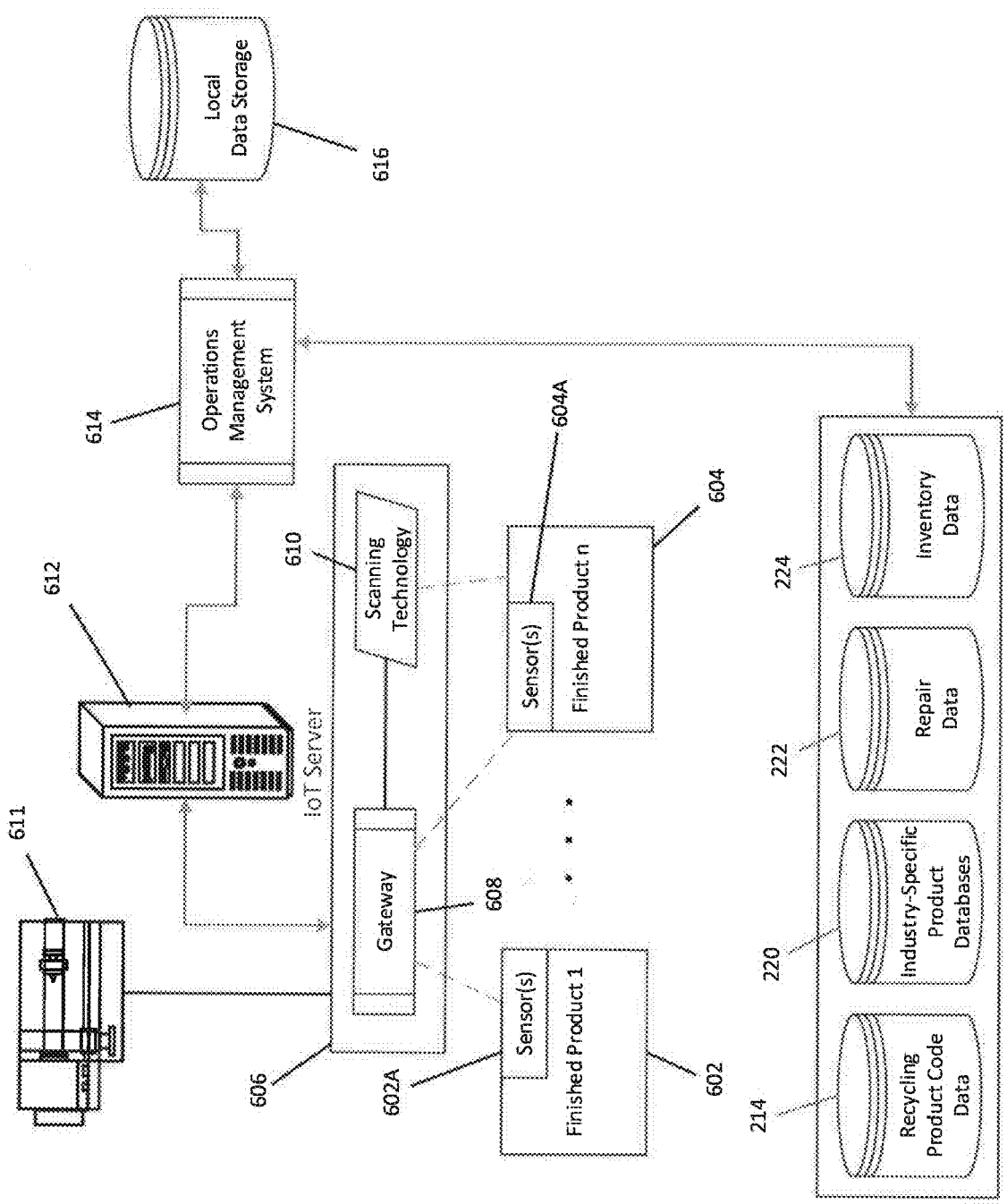
FIG. 6 schematically illustrates one example of a system in which Internet of Things ("IoT") technology is employed in combination with recycling product codes.

In one example of a computer system architecture shown in FIG. 6, finished products 602, 604 can be processed at a manufacturing plant, a storage facility, a repair shop, or a recycling facility, for example, among many other kinds of locations. As shown, each product 602, 604 can be equipped with at least one sensor 602A, 604A (respectively). Each sensor 602A, 604A may be embodied as a card or chip with a microprocessor, or another combination of hardware, software, or firmware. The sensor 602A, 604A can be programmed to capture data indicative of conditions, states, or operating performance levels of the finished product 602, 604. For example, conditions or states such as heat, humidity, pressure, motion, light, temperature peak or median, sunlight peak, sunlight quantity decay, chemical decay, or expiration date, among many others, can be detected. In certain embodiments, data such as an Internet Protocol (IP) number, recycling product code data, component data, and/or other information can be stored in the sensor 602A, 604A. The inventor has recognized that many finished products 602, 604 do not have IP numbers. These types of products may include lower priced products, consumer products, low value machines (e.g., hair dryer, home stereo), or otherwise not durable equipment.

In various embodiments, an identification apparatus or machine 606 can be equipped with a gateway 608 and scanning technology 610 to retrieve and process information related to the products 602, 604. The gateway 608 can be configured with its own IP number and programmed to receive data from the sensors 602A, 604A. Communications between the sensors 602A, 604A and the gateway 608 can be wireline or wireless communications, such as Wi-Fi (SPWF), Bluetooth (SPBT), radio frequency, Sub-GHz (SP1ML, SPSGRF) and NFC (CR95HF) wireless communication. The scanning technology 610 can employ lasers, machine vision, radio frequency, or another suitable electronic scanner technology or device to retrieve product recycling code data, for example, from the products 602, 604. The machine 606 may be equipped with a servo machine or other actuator device 611 that allows the machine 606 to move from area to area within a facility, for example, or from product 602 to product 604 to perform telemetry reading from the sensors 602A, 604A and to read recycling product code data using the scanning technology 610. The machine 606 can be further programmed to receive and process communicated data for transmission to an IoT server 612.

In this example, an operation management system 614 communicates with the IoT server 612 to receive and process sensor data telemetry and operational data, among other captured data associated with the products 602, 604. The operations management system 614, using the machine 606 and the IoT server 612, can be programmed to detect conditions and/or sub-optimal performance of one or more components of the products 602, 604. For example, the system 614 can check recycling product code database 214 to obtain an expected performance level for this specific material for this specific telemetry data. In this manner, a user can perform gap analysis and develop appropriate solutions for product or machine issues. If a state-based component is involved, then data can be recorded in database 616 and operational management system 614 can make business decisions based on gap analysis and actual results. If the products 602, 604 are continuous operational products, then deviation from expected operational parameters can be addressed accordingly. Using a manufacturing recycling product code number, for example, the system 614 can check the repair database 222 for trouble shooting suggestions (if performance for X variable goes below number XYZ number, and performance of Y variable goes below ABC number, then sub component MNQ is likely degraded and needs to be replaced; alternatively, it can be cleaned and lubricated). In another aspect, the system 614 can check the inventory database 224 for price, and repair personnel can be assigned to the factory or warehouse where the product 602, 604 is located with a new or used part to swap out, thereby reducing down time and reducing maintenance costs. In certain embodiments, the operations management system 614 can have one or more operatively associated local data storage media 616 such as for storing sensor data or operational performance level data, for example, for a given location or facility.

Those skilled in the art will appreciate that the combination of sensor 602A, 604A data with recycling product code data can enhance knowledge of what components comprise a given product 602, 604, the past history of ownership and location of the product 602, 604, as well as tracking future ownership, movement and location of the product 602, 604. The data derived from the IoT server 612 and the manufacturing recycling product code data can be replicated to regional, national and global levels, with a list of available operating durable equipment in various factories of the world, making buying used equipment, or recall or replacement of used equipment, or upgrade easier to accomplish.

In one example, the products 602, 604 comprise medications or biological materials in containers. Sensors 602A, 604A are programmed to detect various conditions such as humidity, light, temperature, chemical decay, or other component attributes are attached to the medication container body or lid in a storage facility. These sensors 602A, 604A can be connected for communication with the gateway 608 which has an IP number and which can extract data from the sensors 602A, 604A. Consider a glass medication container with a built-in sensor in lid or package. If storage or transport is in doubt, the user now has granular verification with respect to each individual unit of the product 602, 604.

In another example, operations management system 614 updates the local database 616 with sensor results per finished product 602, 604. Then the system 614 checks for expiration parameters to see if the products 602, 604 or their components are damaged. This can be accomplished by accessing the recycling product code database 214 (i.e., to determine the identity of the product 602, 604), the industry-specific database 220, and the inventory database 224, coupled with business logic and rules to determine a date of manufacturing and characteristics of the product 602, 604. The operations management system 614 can then make decisions about how to process the product 602, 604. Maybe the product 602, 604 should not destroyed but it has lost half of it shelf life due to humidity so the decision is to sell it. Perhaps the product 602, 604 should be left alone but the latest batch of the product 602, 604 should be restricted to a limited quantity for quicker sale and usage. It could also be decided that the product 602, 604 has reached near end of its safe shelf life, and should be discounted heavily. It can be seen that this combination of IoT data with recycling product code data facilitates superior judgments on products, that are both static or state-based as well as those that involve continuous operation, in response to collecting data from sensors 602A, 604A associated with conditions and operating levels such as light, temperature, humidity, chemical decay, physical decay, motion sensors, ultrasound, magnetic, air quality, or specific gas or chemical detection, among many others.

Currently product shelf life is determined theoretically at the factory based on expected half-life chemical decomposition or desirable attributes and expected storage and transport parameters from industry knowledge with many varying assumptions. With the solutions provided herein involving the combination of IoT card sensors, a more accurate shelf life can be determined for a container-based product, for example, based on sensor telemetry specific to the product. This shelf life may be much longer than expected by many years because transport and storage were ideal, for example, and therefore there is no need to dispense with the product. The degradation of the product may only be 50%, meaning two times the dosage is effective. Such enhanced business decision making cannot be done as effectively or efficiently without the combination of IoT sensor data with manufacturing recycling codes.

Figure 7:
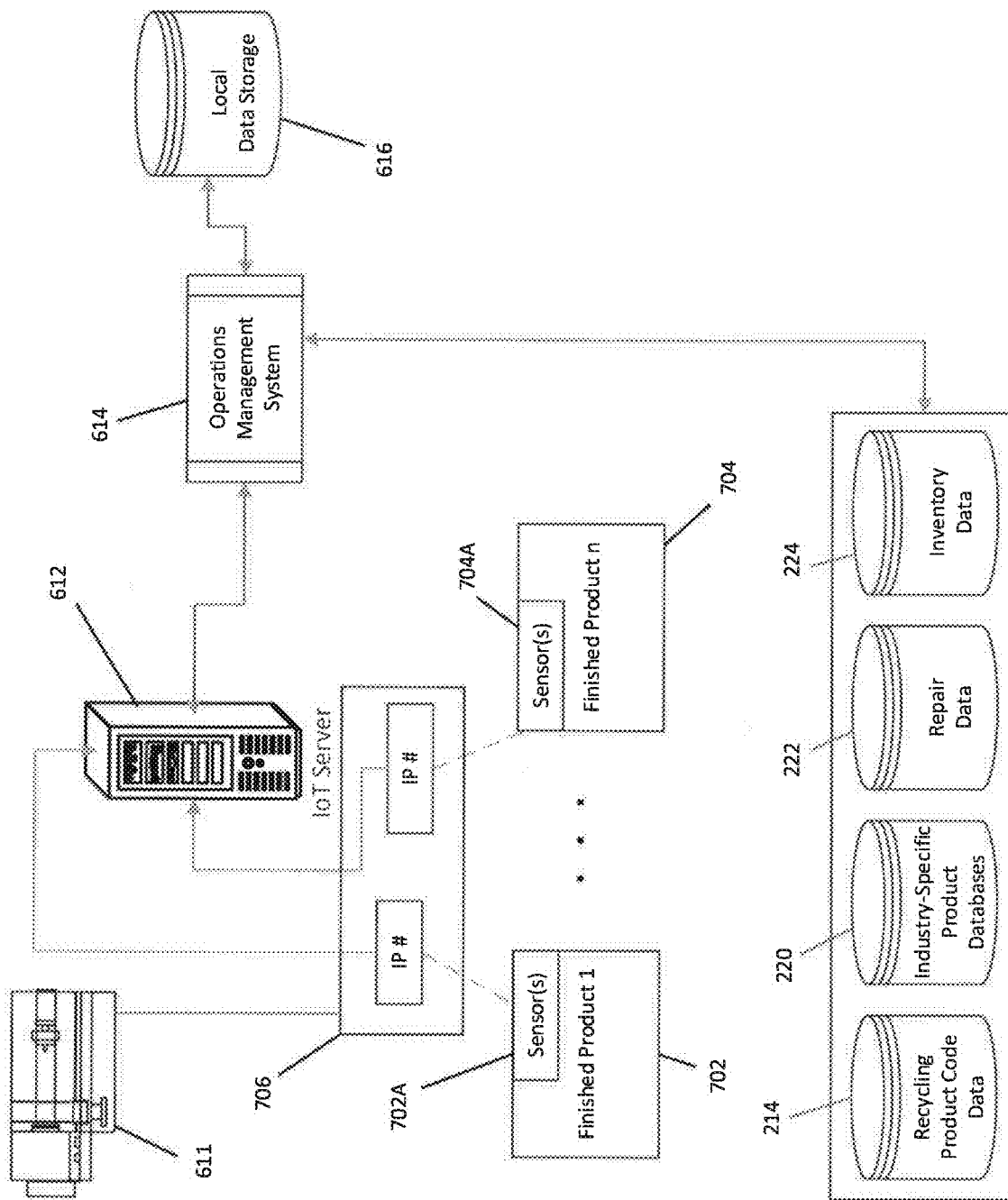
FIG. 7 schematically illustrates another example of a system in which IoT technology is employed in combination with recycling product codes.

In other embodiments of the present invention, FIG. 7 illustrates an example of a scenario in which products 702, 704 are equipped with sensors 702A, 704A (respectively) associated with both an IoT card or chip and an IP number. In addition, product recycling code data has been added to the IoT card. The sensor 702A, 704A can be scanned by a machine 706 programmed with a gateway, for example, to retrieve information from the IoT card, such as the IP number and the recycling product code data, and to communicate the retrieved data to the IoT server 612. The retrieved data can be associated together for a given product 702, 704, and the associated data can be stored by the operations management system 614 in local data storage 616, for example, among other places. For example, the product recycling code data for a given product 702, 704 can be assigned with a specific IP number for that product 702, 704 in database storage. Likewise, telemetry data including operational performance level data derived from the sensors 702A, 704A can be communicated from the IoT server 612 to the operations management server 614, which knows what recycling product code has been assigned to the product 702, 704 because of the association retained in database storage. Armed with the combination of three types of data (sensor telemetry data, IP number, and recycling product code data), the system 614 is well positioned to make enhanced decisions regarding further handling, use, repair, recycling, or disposal of the products 702, 704. Depending on workload at some locations in a facility, a gateway may exist for machine-to-machine communications, or in some situations machine 706 and server 612 may be merged into one machine.

With this solution, scanning technology may not be necessary, because the recycling product code data can be stored on the IoT card. Alternatively, data retrieval to complete the whole set of information for analysis can involve cross-referencing the product code data from a database where recycling code data is stored when the IoT card is initially installed into the product 702, 704. In other embodiments, the operations management system 614 may access one or more of the databases 214, 220, 222, 224 to get information about the product 702, 704 needed to compare operational telemetry for problem or maintenance diagnostics. For example, for operating equipment (e.g., safety diagnostics or wear and tear diagnostics), if the prime product 702, 704 is non-operational, then its sensor 702A, 704A data informs the IoT server 612 that it is malfunctioning. The operations management system 614 can send an inquiry message to a remote database to determine whether the manufacturing recycling product code is associated with a high failure rate, what are the causes of failure based on perimeter variables values versus ideal or expected, and what is the solution or recommended repair process.

It can be seen that the need for unnecessary periodic maintenance can be reduced or eliminated by using the predictive maintenance benefits offered by the present invention. With a manufacturing recycling product number, with specific IoT telemetry data from sensors 702A, 704A communicated by server 612 and analyzed by operations management software 614, a specific component or sub-component which is faulty can be known by using diagnostics. In the past, maintenance schedules were determined theoretically recommended by manufacturer and not based on level or type of unique work by each equipment at each site. Now maintenance can be based on actual observation for that specific user, and maintain and repair rates can be based on failure of component or sub-component knowledge base. With this knowledge, regular periodic maintenance schedules can be optimized and this reduces unnecessary down time. Reliability is enhanced by reducing down time, and this results in higher utilization of the product 702, 704. More fully automated inventory management can be realized by analyzing freshness of food products, for example.

Those skilled in the art can readily see the advantages of combining recycling product code data with information derived from an IoT card. Companies that make machinery, for example, come and go in the business world—altered by bankruptcy, mergers, acquisitions, and other corporate events. While companies are active, they can store information on parts, materials, diagnostics, repair details, and graphics and receive a manufacturing recycling code to put on durable machinery, or expensive equipment. Such information can be stored in one or more of the databases 214, 220, 222, 224, for example. Users can add blogs per manufacturing recycling code on how to repair that type of machine, and a variety of user-generated content can be collected from blogs or similar sites. They can easily search parts inventory databases to buy parts to fix existing machinery. The IoT card can track equipment operational time, history of use, types of activities it was used for, and other events as part of telemetry data stored in local or national databases. The IoT card can capture details of local machinery at the factory in the local database, and then other factories in the world can do the same at their own local databases, and this data can be uploaded to a global database of all equipment at all factories by country, region, or for the whole world. Product recalls can be implemented when owner records are not updated. Searches for specific machines can be performed to identify factories in the world that might have that machine. Companies that make upgrades to old machinery that were made by a now defunct company can find current owners of the old machinery and ask them if they want the upgrade.

The IoT card provides a form of ownership tracking. For example, which factory owns what equipment is generally unknown. Suppose a company made 1,000 huge water pumps last year and sold them to a government who gave them to 1,000 individual farmers. For tracking purposes, the farmers can use smart phones to identify the pumps to the inventory database 224, for example, to allow generation of a list of inventory and associated owners. In other embodiments, repair and maintenance histories of each machine can be stored and retained based on its recycling product code and serial number. Manufacturers can see where equipment moves around the world in commerce, including which machinery is breaking down, machinery breakdowns and fixes, repair instructions and processes, records of inventory, and data related to why and who has purchased their old machinery.

Figure 8:
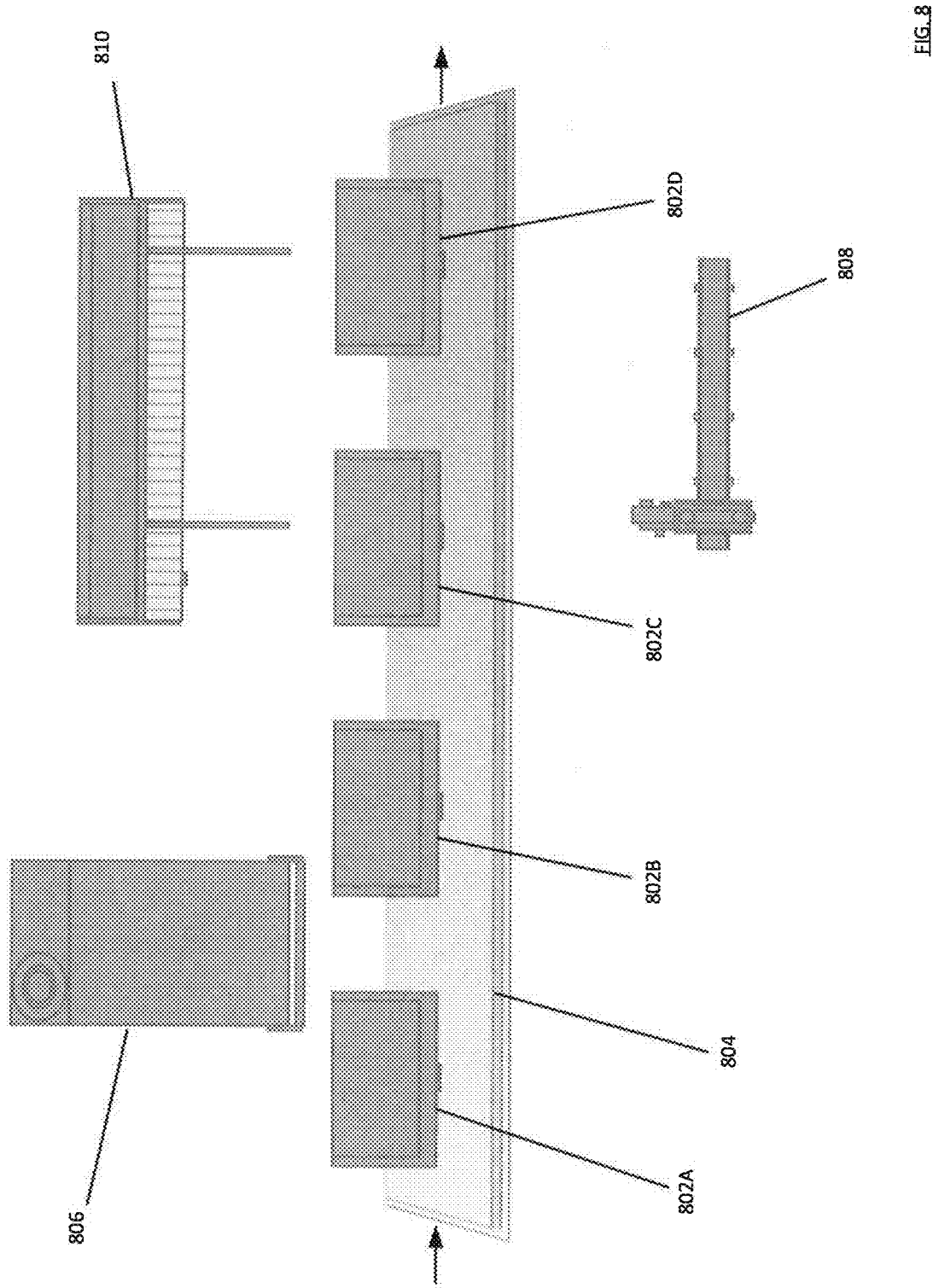
FIG. 8 schematically illustrates examples of scanning technology and electronic scanners which can be used in connection with various embodiments of the invention.

FIG. 8 includes an example of scanning technology (such as scanning technology 305 or 610, for example, or other scanning technology described herein) which can be applied to various products and finished products described herein. In the example shown, products 802A-802D move along conveyor belt 804, such as at a recycling center, manufacturing facility, or other suitable location for processing the products 802. The scanning technology may include machine vision apparatus 806, for example, which may be equipped with a laser or other suitable scanning devices to detect and read product code data imprinted or labeled on the products 802. In another example, a radio frequency (RF) scanner 808 may be used to detect and read product code data magnetically stored on the products 802. In another aspect, a machine 810 can be equipped with a gateway or other communication technology, and the machine 810 may be positionable in the vicinity of the products 802 to detect and collect data generated by various sensors or connecting or reading from IoT cards associated with the products 802. In other embodiments, one or more kinds of other electronic scanners may be employed to detect and collect data derived from the products 802 and their associated components and sub-components.

It can be seen that a disassembly line of millions of products with potentially billions of components and sub-components can be processed both for those products with or without IoT cards. For disassembly of parts and materials, all that might be needed is a manufacturing recycling code for scanners to identify. Usage data on the IoT card identifies if a device or product was used for 1,000 hours' worth of wear-and-tear or 10,000 hours of wear-and-tear, for example. If its components have high wear-and-tear, for example, then disposition of the product may involve recycling instead of reuse.

Figure 9:
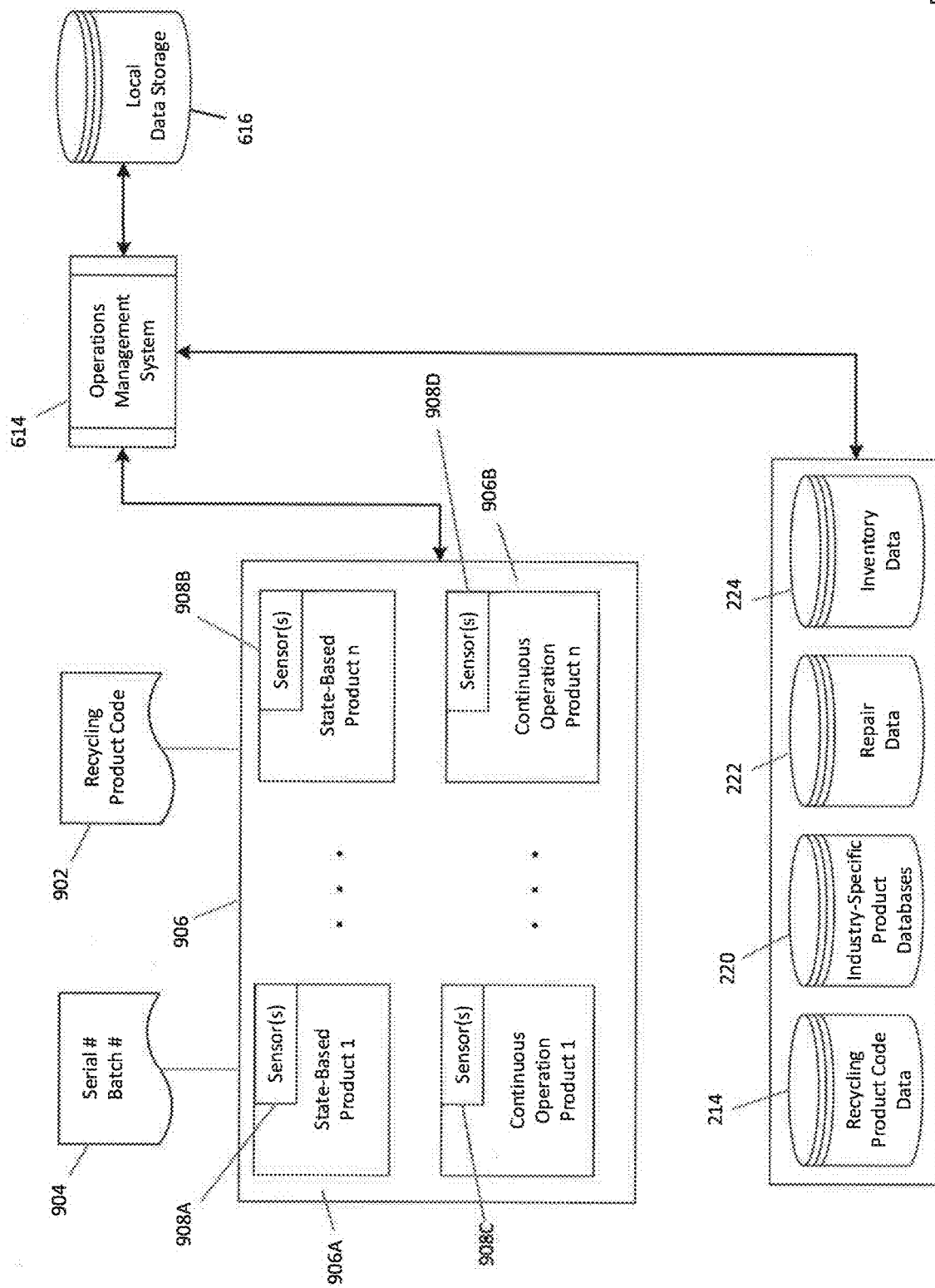
FIG. 9 schematically illustrates an example of a system in which serial number or batch number data can be combined with recycling product code data and/or sensor data for different kinds of products.

With reference to FIG. 9, in certain embodiments various kinds of recycling product code data 902 described herein may be combined with one or more other kinds of other product indicia 904, such as serial numbers or batch numbers, for example. It can be appreciated that various elements and architecture features shown in the systems and process flows of FIGS. 6 and 7 are readily applicable and transferrable to FIG. 9, while omitting depiction of certain elements (e.g., the IoT server 612) in FIG. 9 merely for convenience of disclosure. Combinations of these data 902, 904 in certain processes may be useful for analyzing and making determinations regarding many different kinds of products 906, including state-based products 906A and continuous operation products 906B. The operations management system 614 may be programmed to receive and process both kinds of data 902, 904 including using the data 902, 904 to access various information from the databases 214, 220, 222, 224, 616. In addition, the system 614 may receive sensor data generated and communicated by one or more sensors 908A-908D (e.g., state-based sensors or continuous operation sensors) operatively associated with the products 906.

In one example of a state-based chemical product 906A, the operations management system 614 receives serial number data 904 associated with the product 906A, as well as recycling product code data 902 associated with the product 906A. In this example, the serial number 904 provides an expiration date for the product 906A on a specific date. However, the operations management system 614 processes the recycling product code data 902 for the product 906A and determines that, based on sensor data received from the sensor 908A, the chemical product 906A has only lost half of its effectiveness despite being past the expiration date indicated by the serial number 904. It can be appreciated that this determination may be made after checking one or more of the databases 214, 220, 222, 224, 616, and communicating data related to chemical properties, for example, communicated to the operations management system 614. A longer possible expiration date, for example, may be permitted when sensor 908A, 908B telemetry data are considered in connection with serial number data 904. In this manner, it can be appreciated that a combination of the serial number 904, the recycling product code data 902, and the sensor 908A, 908B data yields an optimal decision for the product 906A (e.g., perhaps to make use of the product 906A rather than dispose of it). In the example above, it was assumed that the sensors 908A, 908B were checking for chemical properties due to sunlight, temperature, or acidity caused by circumstances of storage and transportation. Although data for other factors such as vibration, wear-and-tear, and stress could also be analyzed, including crack length, width size, and other attributes, perhaps by accessing one or more of the databases 214, 220, 222, 224, 616, for example, to collect such data.

In another example involving a continuous operation mechanical pump product 906B, the operations management system 614 receives serial number data 904 associated with the product 906B, as well as recycling product code data 902 associated with the product 906B. In this example, the serial number 904 indicates a recall for the pump 906B after 2,000 hours of operation, because the pump 906B uses defective component X. However, the operations management system 614 processes the recycling product code data 902 for the pump 906B and determines based on the pump manufacturer's recommendations that the pump 906B requires maintenance every 5,000 operating hours, perhaps because the pump manufacturer assumes the pump 906B is operating in acidic fluid or acidic water applications. In this example, the factory where pump 906B is used and the system 614 operates knows that the pump 906B has never been used with acidic water, so the recall associated with the serial number 904 and component X potentially can be disregarded until sensor data from the sensor 908C, 908D indicates an actual problem with component X. In another aspect of this example, the system 614 checks the recycling product code data 902 and determines that a non-defective version of component X is estimated to fail after 7,000 operating hours. However, when the system 614 checks one or more of the databases 214, 220, 222, 224, 616, the system 614 determines from user blogs, for example, that for this specific batch the failure mean is 12,000 hours. In this case, manufacturing suggested failure time might be temporarily ignored until the end of the business season when equipment can be taken down for maintenance and repairs for that specific factory because it operates in non-acidic fluid. The system 614 can continue to monitor the operating hours for the pump 906B and communicate a notification when it is time to remove the pump 906B from the production line to replace component X. Again, it can be appreciated how using certain combinations of the serial number indicia 904, the recycling product code data 902, and/or the sensor data associated with the product 906B can generate better decisions for how to use the product 906B and to recall, repair, maintain, recycle or dispose of its components.

Figure 10:
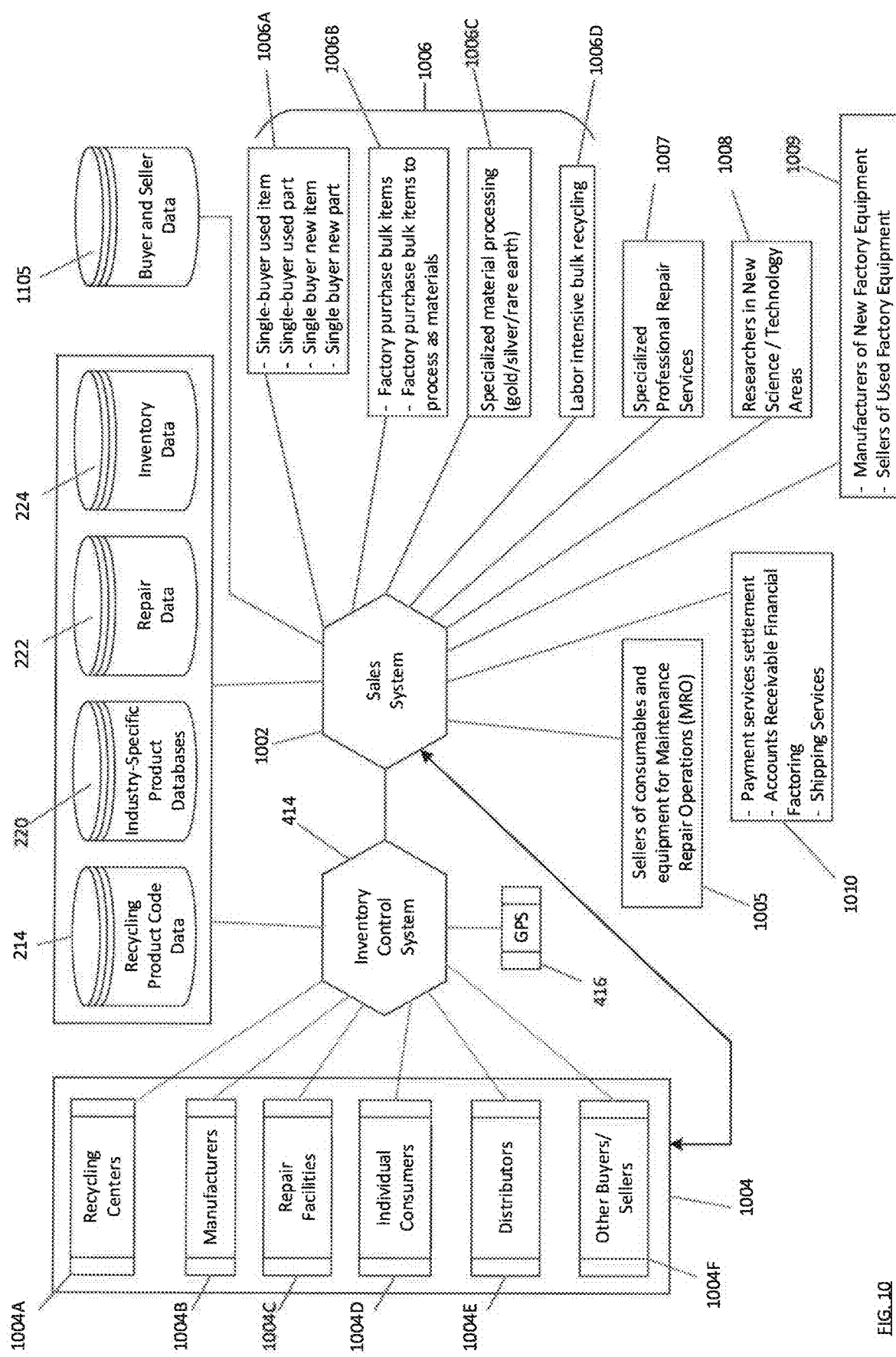
FIG. 10 shows an example of an architecture including an inventory control system, a sales system, and various users in operative communication.
Figure 11:
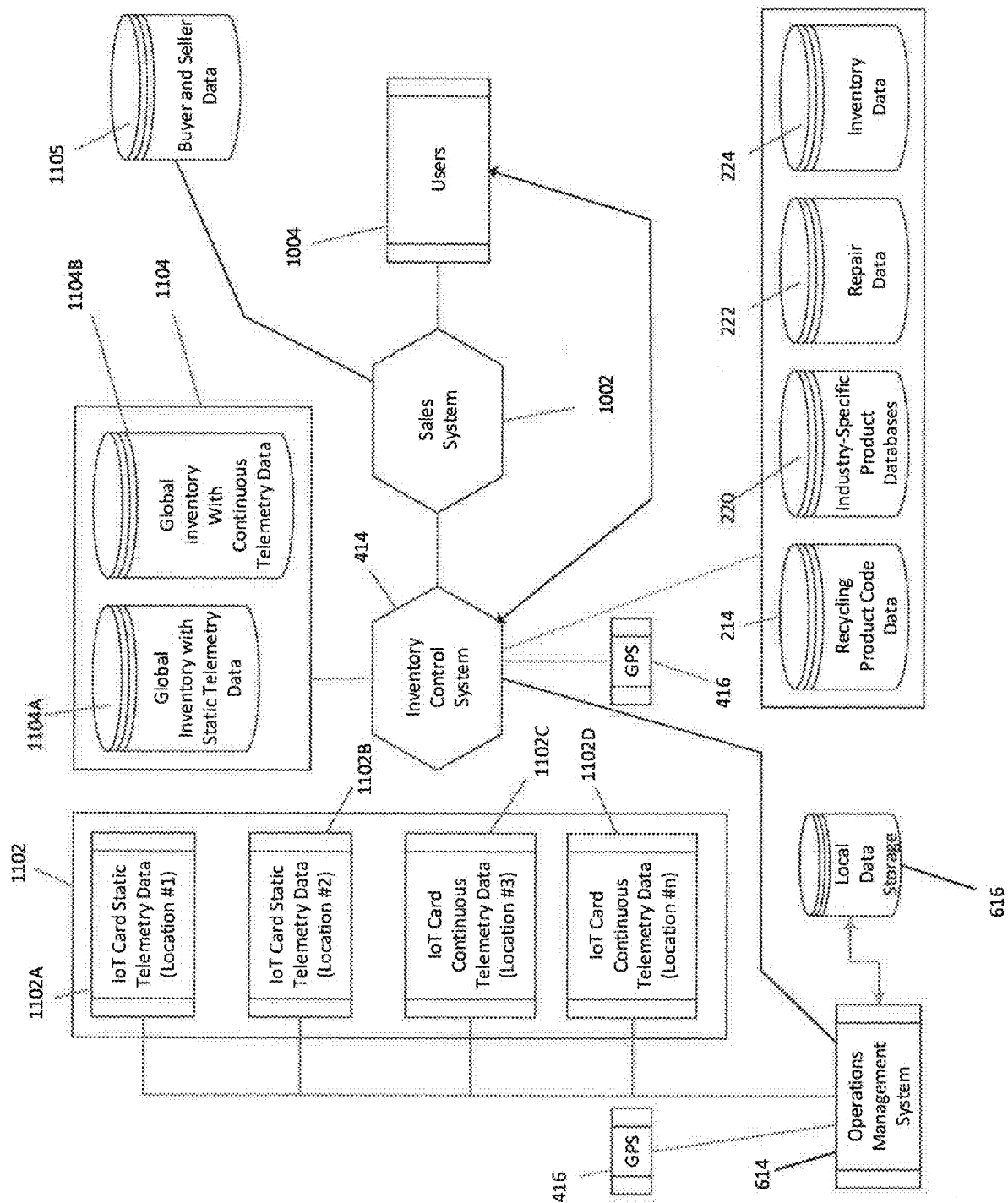
FIG. 11 shows another example of an architecture including an inventory control system, a sales system, and various users in operative communication with these systems.

With reference to FIGS. 10 and 11, and in connection with various processes and data storage media described above, in certain embodiments a marketplace can be created among various users. In this example, the inventory control system 414 can be configured for communication and retrieval of data associated with the databases 214, 220, 222, 224, as shown. A sales system 1002 is provided to allow various users 1004 to search for components, make offers to buy or sell, request proposals (i.e., requests for proposal or RFPs) from other users 1004, and/or to generally participate in a marketplace for components, raw materials, and other elements of finished goods. Sales system 1002 may be configured as an electronic computer system accessible by the various users 1004 to allow for communicating data with the inventory control system 414 and/or various databases, such as databases 1005-1010. In certain embodiments, RFPs can be managed by auction or reverse auction, for example, perhaps by awarding the lowest cost using part number or system number. FIG. 11 demonstrates how data from various IoT cards and sensors (see discussion above) may be communicated to the inventory control system 414 from various static data sources 1102A, 1102B and/or various continuous data sources 1102C, 1102D, for example. In one aspect, global databases 1104A, 1104B can be part of the broader body of data stored and managed by the inventory control system 414, perhaps to relate IoT sensor data to a particular component or system, for example. In certain embodiments, purchase history, previous owner IoT card usage, or other patterns of one or more kinds of users 1004 may be made accessible through one or both of the systems 414, 1002. FIGS. 12 through 20 provide numerous examples of data table structures which can be stored and managed by the inventory control system 414 and/or the sales system 1002. In various embodiments, the data table structures shown in FIGS. 12 through 17 may be stored in and accessed via database 1105, for example, and the data table structures shown in FIGS. 18 through 20 may be stored in and accessed via databases 214, 220, for example, among other storage locations.

With reference to FIG. 11, the inventory control system 414 can assign GPS location to inventory to make sure that product or component location information is made available to users 1004 across the world. The inventory database 224 can be updated by the inventory control system 414 such as by copying inventory of many recycling centers in a selected region, country or the world, so that inventory information is globally viewable and accessible. This allows a user anywhere in the world to see identical inventory data for all components and materials in the world. Searching can be narrowed by region, or narrowed by country or narrowed by region inside of country, depending on inventory database configuration and desired search. A unique number for each part, component, or material is accessible and searchable on a worldwide basis with a GPS location discoverable on a global basis. It can be appreciated that lowest distance using GPS location may not be equivalent to the lowest transportation cost. Information obtained from database 1010, for example, can be used to inform buyers about the actual cost of transportation and specific product prices for one supplier might be different than product pricing of another supplier who has lower transportation costs. For example, a product may be located at a distributor in New York City with a 2000-mile shipping distance to San Diego by truck, and its transportation cost could be twice the cost of shipping by ocean from Shanghai to the port of San Diego. Shipping brokers might also act as customs brokers, and VAT, tariff, and transport fee information provided in the database 1010 might change the outcome of a product purchase decision.

In one example, and with reference again to FIGS. 12 through 20, suppose a user factory makes sub-component STRING P0001, and the user wants to know who in the last year in the United States region made primary products that used strings as components. The inventory control system 414 may provide access to properties of string accessible through databases 214 or 220 (see FIG. 18), for example. In database 214 or 220, a single component table could be used to find component P0001, and a system table (see FIG. 19) could be used to see companies that make a system product that use that component (such as factory F0001). In one aspect, a listing of all prime product makers who used a certain type of string (e.g., P0001) can be generated for the user. If the user is a competitor for P0001A, for example, using inventory control system 414 in connection with databases 214, 220 allows for subcomponent to prime product maker marketing. Using the system table, three factories F0002, F0003, and F0004 are shown that use P0001A to make three products S0002, S0003, and S0004. A factory can also list a teaser or shadow inventory stored in database 224 using the sales system 1002, or stored in database 1104 using the sales system 1002 and the inventory control system 414 (see FIG. 1). This is an inventory of products that can be made, with product information of system and component grandparent, parent and child numbers and graphics stored in databases 214 and 220, coupled with marketing information (e.g., brochures) about their company stored in database 1105, for example. Companies can list many variations the product, or in their factory brochures can list the engineering skills to engineer and make custom products to customer specifications.

The user can see that there are three systems S0002, S0003, S0004 that use P0001A as a component or subsystem (see FIG. 19). The system table can be searched to find parent P0001A product companies in the user's area. The user competitor component maker might market a superior string, and the company should make the user's string as a standard component because its mean time to failure is ten years, and that cannot be matched by competitors whose mean time to failure is five years. So, the user studies the system table to determine who uses string type P0001A and tries to market its superior product to companies that use strong type P0001A. The system table can be used with a component number to find different factory numbers that build systems using this component. The user may see factory F0002 for a S0002 marketing possibility, but system S0002, which is part of two other systems S0003, S0004, are made by factory F0003, and F0004 represents a secondary possible solicitation target.

Using databases 214 or 220 on a per-component basis, marketing information can be provided on grandchildren numbers, children numbers, parent numbers and grandparent numbers who may be the top prime number. These searches can use prime grandparent, parent, children, and grandchildren relationships can be restricted by geography if desired. In another example, by using the table shown in FIG. 18 in conjunction with databases 214 or 220, a grandparent system maker—desiring higher quality components and perhaps seeking to hire a private label contract factory like F0004—can search for higher quality grandchild sub-components to tell father system suppliers to use that specific sub-component. Such searches can be performed based on material attributes, material properties, or component names, for example, among other kinds of identifying characteristics. In this example, the user learns that P0001A has a higher density or string strength than P0001. The user can specify use of such higher strength components by upstream system integrators, like factories F0001, F0002 and F0003. In this context, "upstream" means moving in the direction from child level (e.g., component or sub-component) to parent level (e.g., system); while "downstream" means moving in the direction from parent level (e.g., system) to child level (e.g., component or sub-component).

A user or seller of new or used factory equipment can search for buyers for its equipment by searching for the component numbers in a table of factories (see FIG. 20) to see which factories are making those components, then the user knows to whom to sell new or used factory equipment. Alternatively, if the user is an equipment maker making plastic discs P0002 or P0002A, the user can access the single component table (see FIG. 18) to know that factory F0002 makes such a product, and possibly could have interest in the user's new or used factory equipment. In another example, if the user makes equipment for manufacturing ball bearings P0004, it can see from the single component table that F0004 is a product maker. Alternatively, if the user or seller wants to make P0004, it can see that in the system table factory F0004 uses component P0004 and has power to change specifications. The user may sell to the lowest child factory F0003 component maker which in turn sells to F0004, and can go lower down the chain to sell to the system maker that sells to factory F0004. Alternatively, used equipment seller with equipment which makes P0002 or P0002A (see FIG. 18) sees what is thought to be the lowest-quality component maker F0002 who supplies F0003 (which in turn supplies F0004) and may not be interested in factory equipment. But a system maker F0004 who wants to control quality and does not want to buy low-quality outsourced parts and wants to make all parts or components in-house can buy that new or used equipment to make high quality parts that they previously bought from other factories or other sources.

In another example, using a database of grandparents, parents, children, grandchildren, database 214, 220 allows for purchasing arbitrage. A professional high-volume repair facility 1007 (see FIG. 10) that needs product number P0001 can search the database and see in the table of systems (see FIG. 19) that P0001 is a component of system S0001 made from product numbers P0001 and P0002, and using the table shown in FIG. 14B sees a quantity of S0001 selling for $20 at a seller R0002. If shipping costs are included, then R0002 is less expensive than R0001, as can be seen by accessing the table shown in FIG. 14A. So the database of grandparents, parents, children, and grandchildren, etc., allows for purchasing arbitrage. The user can buy S0001 for part P0001 knowing that inside of a year it will also use part P0002. Alternatively, a factory 1006B can buy used parts by volume in the same way described above. This arbitrage is also the same for labor intensive recycling centers 1006D seeking to buy inventory, and the same is true for specialized recycling centers 1006C seeking to buy inventory. In addition, individuals 1006A can buy small quantity new or used component or new parts and materials from D0001 distributor warehouse (see FIG. 15), or used seller US2002 (see FIG. 16).

In another example, a factory 1006B or specialized material processing facility 1006C (e.g., gold, silver, or rare earth) might want parts for materials and not for parts. A company buying parts for materials cotton strings can do the same arbitrage. Using the single component table (see FIG.

18), the company buyer discovers that two product numbers (P0001 and P0001A) have cotton strings. Both are made by the same factory F0001, but customer buyer may prefer to buy P0001A due to higher density. Using the system table (see FIG. 19), the buyer discovers S0002 uses P0001A which is the 50% heavier string. So, the buyer using the table shown in FIG. 14A could buy 1000 of P0001A for $20 from seller R0001, or could buy 1000 of S0002 for $20 from the same seller R0001. But if the buyer buys 1000 of S0002 for the same price from seller R0001, the buyer gets 50% more cotton string weight than S0001. The buyer could also get 1000 plastic discs P0002 for free to recycle. While the buyer gets the best purchasing price, the buyer still has processing costs to separate the strings from the yoyos, and still has the burden of selling the strings and plastic discs at a high enough price for a profit. The arbitrage might not only be in the buying of part P0001 or part S0001, but also in the arbitrage based on shipping costs, terms of trade, quantity, or other factors. By having seller and buyer applying GPS-based costing of transportation, terms and conditions of shipping may be different for different sellers, and this can be discovered easily by the buyer. Alternatively, researchers in new science and technology 1008 may use the sales system 1002 to access database 224, for example, to discover stored materials that were not economical to process in the past or which are pollutants but with promising chemical elements. With the advent of future science and technology developments their value can be extracted, so a study of quantity and locations of stored materials can be done for market feasibility.

In another example involving the system table (see FIG. 19), S0001 is made from one type of plastic P0002, and S0002 uses another kind of plastic P0002A. Using database 214, 220, or 222, the user can discover that although both are yoyos, S0002 is a disc made into two pieces and is easier to disassemble, making disassembly for used components or recycle for materials more advantageous. So S0002 might be preferred over S0001. Detailed knowledge of identifying the type of plastic makes it easier for recycling or a specialized processor. Also, by using database 222, graphics or pictures of components can assist the buyer in making informed decisions. The database of parts manufacturers or system manufacturers in databases 214, 220 can be used to solicit requests for proposal from sub-component makers or sub-system makers.

In another example, suppose a company buyer desires to compete against F0004 and sell Queen Yo-Yo (made of P0001A heavy string and P0002A heavy plastic), which has auto return and ceramic clutch (using P0003 clutch) with ball bearing (P0004). The company buyer wants to subcontract the production to an existing yoyo factory system maker. So, the company searches a table of factories (see FIG. 20) and sees four factories that build four different types of yoyos. The company can seek prices from three yoyo factories (e.g., F0001, F0002 and F0003) in different sourcing combinations. As one option, the company can ask F0001 to be an integration assembly company and ask them for a price for assembly to make P0001A heavy string (made by F0001) to receive shipments of P0003 ceramic clutch from F0003 and P0004 bearing from F0004 and heavy disk P0002A from factory F0002. In another option, the company can ask factory F0002 to be integrator assembler. So F0002 gets part P0001A from F0001 and has it shipped to factory F0002 itself, and then receiving part P0003 from F0003 and part P0004 from F0004 factory. Here F0002 becomes the integration assembly factory pulling in parts from three other factories. As another option, the company can ask F0003 to become the integrator assembler (obtaining parts from F0001 (P0001A), F0002 (P0002A), and F0004 (P0004). It can be seen that by having a database of grandfather, parents, children, grandchildren, etc., the user can solicit prices in various combinations from various factories. Contract manufacturing can now easily be engaged.

In one aspect, the system can be used to facilitate a reverse auction from system factory supplier to prime factory. Because users can see grandfather-parents-children-grandchildren, it is known which companies are capable of answering a request for proposal. This solution using the approach shown in FIG. 20 allows only the most appropriate, well-suited candidate factories to be solicited, not a shotgun approach to investigating many unknown factories. Factories can list their inventories of different possible products they can make in the database and based on inquires can give a price proposal, which creates a hypothetical production option. In the table of sellers (see FIG. 12), information about all sellers can be discovered, and each seller (see FIG. 17) may have its own inventory table. By using a data table structure, factories can list variations of single items or systems to discover buyers who search for them. Alternatively, by product number or by system number, a user can use the sales system 1002 and access the database 1105 of sellers and buyers to search past sales history and reputation per product per seller. Sellers can check on buyers by buyer identifier history of purchasing that specific product or system and determine if these are serious buyers who do or do not have experience or knowledge in this area. Alternatively, a large buyer/user can save time and search sellers who are factories or distributors with experience in past history of selling this product based on product number or system number, and not waste time with distributors who do not have inventory or do not offer a competitive price. In certain embodiments, buyers and sellers can score each other to build a reputation after every sale on the network With regard to IoT embodiments described herein, suppose a user has a chemical vat with an expected expiration date, but only one of two shipments had been stored and transported under ideal circumstances (e.g., max heat, period of heat, humidity, sunlight, vibration, etc.). The same batch serial number of the chemical was split into two locations: the first shipment had ideal circumstances at its location, and the second shipment had less than ideal circumstances as determined by IoT sensor data at its location. Coincidently, both parts of the batch were returned to the marketplace to be resold at the same time. The market system has a record of the data for IoT card from that manufacturing recycling code number. The inventory control system 414 communicates with the operations management system 614 which stores data in local data storage 616 and in databases 1104. Serial number and batch number alone do not provide a complete picture. Stored telemetry in the database from the IoT card, combined with manufacturing recycling code components and content knowledge, can be used to tell various users (e.g., a system user or a user of a piece of equipment equipped with an IoT card) about IoT data for a component associated with different impacts from heat, sunlight, vibration, humidity, use, or other factors which may have degraded the quality of the component in the chemical vat.

Similarly, with IoT continuous data: suppose two pumps are manufactured at the same time with identical parts, but IoT continuous card reflects wear and tear data as different on the second pump due to its historical uses involving salt water and small sand. When the two used pumps come up for sale, the history data captured by the IoT card will be available to buyers and will likely result in different prices for pumps. The inventory control system 414 communicates with the operations management system 614 which stores data in local data storage 616 and in databases 1104. In another aspect, the buyer can compare and contrast different pumps for sale by different factories not only by looking at telemetry data in a database 1104, but also by looking at manufacturing recycling codes to see quality of components (e.g., steel vs. stainless steel) and methods of manufacturing to determine if usage could have shortened the life expectancy of the equipment, perhaps in connection with accessing databases 214, 220. Products with manufacturing recycling bar codes, graphics, and details of materials with IoT card data should have comparatively higher value in the marketplace of equipment in comparison to equipment with no IoT card data and no product recycling code. Alternatively, one can combine wear and tear telemetry knowledge with knowledge of product recycling codes to know which machine to buy with internal components with the least damage or misuse. In another example, determining that a used cam shaft part is in acceptable condition (as evidenced by wear and tear data derived from telemetry usage data stored in the database 1104B, for example) may be a proxy leading to purchase of the parent product of which the cam shaft is a component.

With reference to FIG. 10, a single buyer 1006A can use the sales system 1002 and access the table shown in FIG. 16 (which can be stored in database 1105) to find a used single item as part of a single purchase. The sales system 1002 can manage a table of sellers (as shown in FIG. 12) and a table of buyers (as shown in FIG. 13), for users to know with whom they are trading, their sales history, and whether or not they are reliable business entities. Those skilled in the art will appreciate that embodiments of the invention represent a new tool which can create a new marketplace first for used parts and materials, then new parts and materials entities will come to the marketplace to sell, followed by distributors and other users such as buyers for parts or used items. The system can complement companies that deliver manufacturing repair and operations services 1005 to factories and repair shops of the world. An OEM factory 1004B with new inventory can list it through the inventory control system. Items made of many parts and materials may have product recycling numbers and can be sold as qualified used items (see FIG. 16). An ecosystem is created in which users communicate in the same place for the same reasons to obtain parts, machinery, materials, new equipment, or MRO suppliers 1005, and supported by payment, factoring, and shipping services 1010, among other things. Specialized professional trained repair facilities 1007 will also be able to buy and list their parts as inventory to the world. Users can search by master grandparent, parent or child to find companies with unique needs for consumables, materials, or parts based on the types of products or properties of products that they make. A database of buyers can be provided who have purchased specific products, and these buyers can be targets for the sale of consumables, for example.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, configurations, data definitions, or process flows described herein are necessarily intended to limit the scope of the invention, unless such aspects are specifically included in the claims.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network. The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol (IP), web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by an electronic computer processor.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing" "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

All examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure.

Although various systems described herein may be embodied in software or code executed by hardware as discussed above, as an alternative the same may also be embodied in dedicated hardware or a combination of software and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flow charts and methods described herein show the functionality and operation of various implementations. If embodied in software, each block, step, or action may represent a module, segment, or portion of code that comprises program instructions to implement the specified logical functions. The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical functions.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A method for processing a finished product having multiple components associated therewith, the method comprising:

identifying, with an electronic scanner, at least one parent recycling product code associated with a finished product, wherein the parent recycling product code is universally applied to the finished product on a global basis;

retrieving, with the processor from an electronic database, at least one dependent recycling product code associated with the identified parent recycling product code, wherein each retrieved dependent recycling product code is associated with one of the multiple components associated with the finished product;

identifying at least one of the components associated with the finished product in accordance with the retrieved dependent recycling product code;

accessing at least one electronic inventory database comprising at least one of:
retrieving data associated with at least one of the identified components of the finished product, or
storing data associated with at least one of the identified components of the finished product;

using at least one parent of the recycling product codes and at least one dependent of the product recycling codes for retrieving, from at least one electronic database, data associated with at least one identified component of the finished product; and making at least one of a repair, maintenance, or recycle determination in association with retrieving the data associated with the at least one identified component of the finished product.

2. The method of claim 1, further comprising disassembling at least one identified component from the finished product in connection with the repair, maintenance, or recycle determination.

3. The method of claim 1, further comprising retrieving global positioning information in connection with retrieving the data associated with the at least one identified component of the finished product.

4. The method of claim 1, further comprising accessing a single component data table to identify at least one component of the finished product.

5. The method of claim 4, further comprising accessing at least one of attribute data, properties data, material data, assembly data, disassembly data, or a combination thereof for at least one identified component.

6. The method of claim 1, further comprising accessing a systems table for locating t least one producer of a finished product which incorporates into a product the at least one identified component of the finished product.

7. The method of claim 1, further comprising accessing a table of manufacturers for locating at least one manufacturer of the at least one identified component of the finished product or at least one system.

8. The method of claim 1, further comprising communicating data to at least one table of sellers.

9. The method of claim 8, further comprising communicating data associated with a prior sales history of at least one seller and in association with at least one system or component.

10. The method of claim 1, further comprising communicating data to at least one table of buyers.

11. The method of claim 10, further comprising communicating data associated with a prior purchase history of at least one buyer and in association with at least one system or component.

12. The method of claim 1, further comprising communicating data to at least one repair facility from a single component table, a table of systems, a table of manufacturers, or a combination thereof.

13. The method of claim 1, further comprising communicating data to at least one recycling center from a single component table, a table of systems, a table of manufacturers, or a combination thereof.

14. The method of claim 1, further comprising communicating data to at least one manufacturer from a single component table, a table of systems, a table of manufacturers, or a combination thereof.

15. The method of claim 1, further comprising soliciting at least one request for proposal in connection with at least a portion of the data stored in at least one of a single component table, a table of systems, a table of manufacturers, a table of buyers, a table of sellers, or a combination thereof.

16. The method of claim 15, further comprising executing at least one purchase transaction in connection with at least one component associated with a parent product recycling code, at least one component associated with a dependent product recycling code, at least one system associated with a parent product recycling code, at least one system associated with a dependent product recycling code, or a combination thereof.

17. The method of claim 1, further comprising receiving data from an IoT card comprising at least one sensor operatively associated with the finished product.

18. The method of claim 17, further comprising communicating at least one product recycling code in combination with the received sensor data.

19. The method of claim 18, further comprising communicating information obtained from the IoT card related to usage data, properties data, transportation data, or handling data associated with the at least one identified component of the finished product.

20. The method of claim 1, further comprising receiving inventory information from at least one recycling center which information is viewable through accessing the inventory database.

21. The method of claim 1, further comprising receiving inventory information from at least one repair center information is viewable through accessing the inventory database.

22. The method of claim 1, further comprising receiving inventory information from at least one original equipment manufacturer which information is viewable through accessing the inventory database.

23. The method of claim 1, further comprising receiving inventory information from at least one individual consumer which information is viewable through accessing the inventory database.

24. The method of claim 1, further comprising receiving inventory information from at least one distributor which information is viewable through accessing the inventory database.

25. The method of claim 1, further comprising receiving inventory information from:
a plurality of recycling centers, which information is viewable through accessing the inventory database;
a plurality of repair centers, which information is viewable through accessing the inventory database;
a plurality of original equipment manufacturers, Which information is viewable through accessing the inventory database;
a plurality of individual consumers, which information is viewable through accessing the inventory database; and
a plurality of distributors, which information is viewable through accessing the inventory database.

26. The method of claim 25, further comprising executing a sale of at least one in connection with at least a portion of the inventory information.

27. The method of claim 1, further comprising:
obtaining data for at least one component or system made by a manufacturer from at least one of a single component table, a table of systems, a table of manufacturers, a data storage containing IoT card data, or a combination thereof; and,
processing a solicitation associated with a seller of new or used equipment, wherein the solicitation includes an offer to sell equipment in response to the obtained data.

28. The method of claim 1, further comprising:
obtaining data for at least one component or system made by a manufacturer from at least one of a single component table, a table of systems, a table of manufacturers, a data storage containing IoT card data, or a combination thereof; and,
processing a solicitation associated with a seller of a consumable product, wherein the solicitation includes an offer to sell the consumable product in response to the obtained data.

* * * * *